US011793384B2

(12) United States Patent
Arora et al.

(10) Patent No.: US 11,793,384 B2
(45) Date of Patent: Oct. 24, 2023

(54) USER INTERFACES FOR AUTONOMOUS CLEANING ROBOTS

(71) Applicant: iRobot Corporation, Bedford, MA (US)

(72) Inventors: Shipra Arora, Cambridge, MA (US); Lauren D. Stern, Medford, MA (US); Benjamin H. Schriesheim, Watertown, MA (US); Cory White, Newburyport, MA (US)

(73) Assignee: iRobot Corporation, Bedford, MA (US)

( * ) Notice: Subject to any disclaimer, the term of this patent is extended or adjusted under 35 U.S.C. 154(b) by 219 days.

(21) Appl. No.: 17/364,580

(22) Filed: Jun. 30, 2021

(65) Prior Publication Data

US 2023/0000301 A1    Jan. 5, 2023

(51) Int. Cl.
*A47L 11/40*     (2006.01)
*G05D 1/00*      (2006.01)

(52) U.S. Cl.
CPC ........ *A47L 11/4011* (2013.01); *G05D 1/0016* (2013.01); *G05D 1/0088* (2013.01); *A47L 2201/04* (2013.01); *G05D 2201/0203* (2013.01)

(58) Field of Classification Search
CPC ........ A47L 7/0085; A47L 9/009; A47L 9/106; A47L 9/91; A47L 9/2805; A47L 9/2826; A47L 9/2836; A47L 9/2852; A47L 9/2857; A47L 9/2884; A47L 9/2889; A47L 9/30; A47L 11/24; A47L 11/4011; A47L 11/4013; A47L 2201/00; A47L 2201/022; A47L 2201/04; A47L 2201/06; B25J 9/00; B60Q 1/50; G05D 1/0016; G05D 1/0088;

(Continued)

(56) References Cited

U.S. PATENT DOCUMENTS

| 2013/0061408 | A1 | 3/2013 | Woods |
| 2018/0260107 | A1* | 9/2018 | Dare ................. G06Q 30/0641 |

FOREIGN PATENT DOCUMENTS

| CN | 111887777 A * | 11/2020 | ............. A47L 11/24 |
| EP | 2659824 | 11/2013 | |
| JP | 2020075032 | 5/2020 | |

OTHER PUBLICATIONS

English Machine Translation of CN-111887777-A, Accessed Mar. 30, 2023.*

(Continued)

*Primary Examiner* — Jeff A Burke
*Assistant Examiner* — Blake A Wood
(74) *Attorney, Agent, or Firm* — Fish & Richardson P.C.

(57) ABSTRACT

Some autonomous cleaning robots include a drive configured to maneuver the autonomous cleaning robot about a floor surface. The robots include a cleaning system to clean the floor surface as the autonomous cleaning robot is maneuvered about the floor surface. The robots include a robot button positioned on the autonomous cleaning robot. The robots include a controller in electrical communication with the drive and the robot button. The controller is configured to perform operations including selecting a behavior of the autonomous cleaning robot from a plurality of behaviors of the autonomous cleaning robot responsive to a duration of actuation of the robot button and causing the autonomous mobile robot to initiate the behavior.

25 Claims, 13 Drawing Sheets

(58) Field of Classification Search
CPC .......... G05D 1/0246; G05D 2201/0203; Y10S 901/01
See application file for complete search history.

(56) References Cited

OTHER PUBLICATIONS

Neatorobotics.com [online], "Neato Botvac: User Manual," May 28, 2015, retrieved on Sep. 28, 2021, retrieved from URL <http://9896d21996451ba802bb-35ef0235e67679408ce08cbf73c43dde.194.cf2.rackcdn.com/Botvac%20Documentation/NeatoBotvac_UserManual_091114_English.pdf>, 27 pages.

Eufylife.com [online], "Eufy: Owner's Manual Robo Vac," Oct. 25, 2020, retrieved on Sep. 28, 2021, retrieved from URL <https://d2211byn0pk9fi.cloudfront.net/spree/accessories/attachments/80357/T2130-EN-Manual-V01-20190814.pdf?1570606443>, 22 pages.

Site-static.com [online], "Deebot U2 Series: Instruction Manual," Jan. 25, 2021, retrieved on Sep. 28, 2021, retrieved from URL<https://site-static.ecovacs.com/upload/file/support/2020/1228/060554_2078.pdf>, 92 pages.

Neatorobotics.com [online], "Neato Botvac D7 Connected," Oct. 27, 2020, retrieved on Sep. 28, 2021, retrieved from URL <https://neatorobotics.com/docs/Neato%20GSG-User%20Guide%20D7_5%20Language_06.22.2020_Rev.3.pdf>, 96 pages.

International Search Report and Written Opinion in International Appln. No. PCT/US2022/026819, dated Jul. 14, 2022, 15 pages.

\* cited by examiner

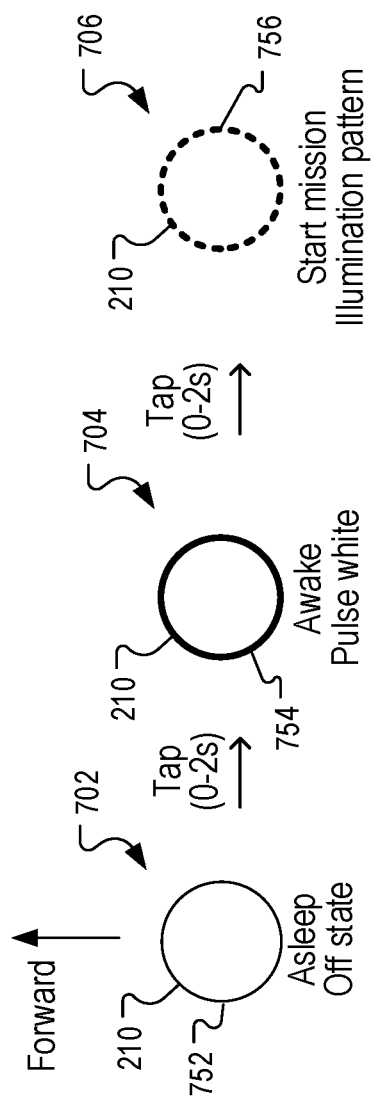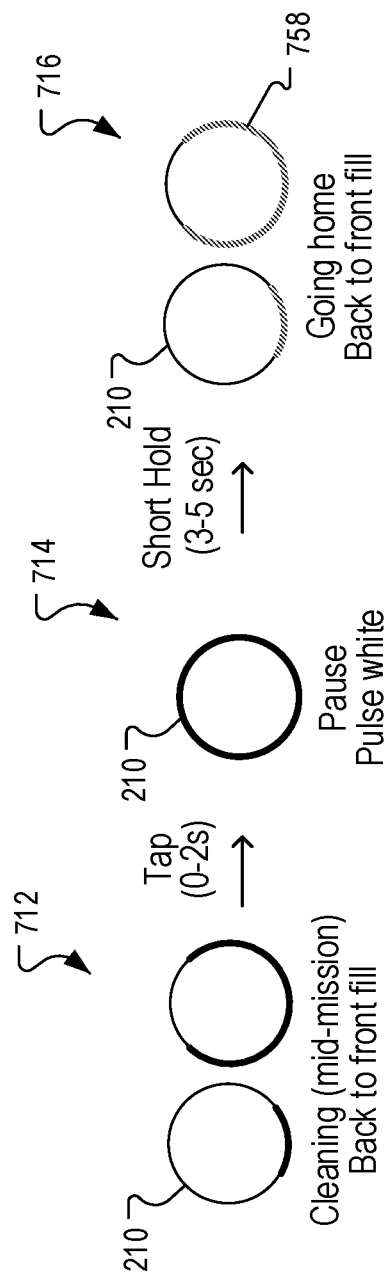

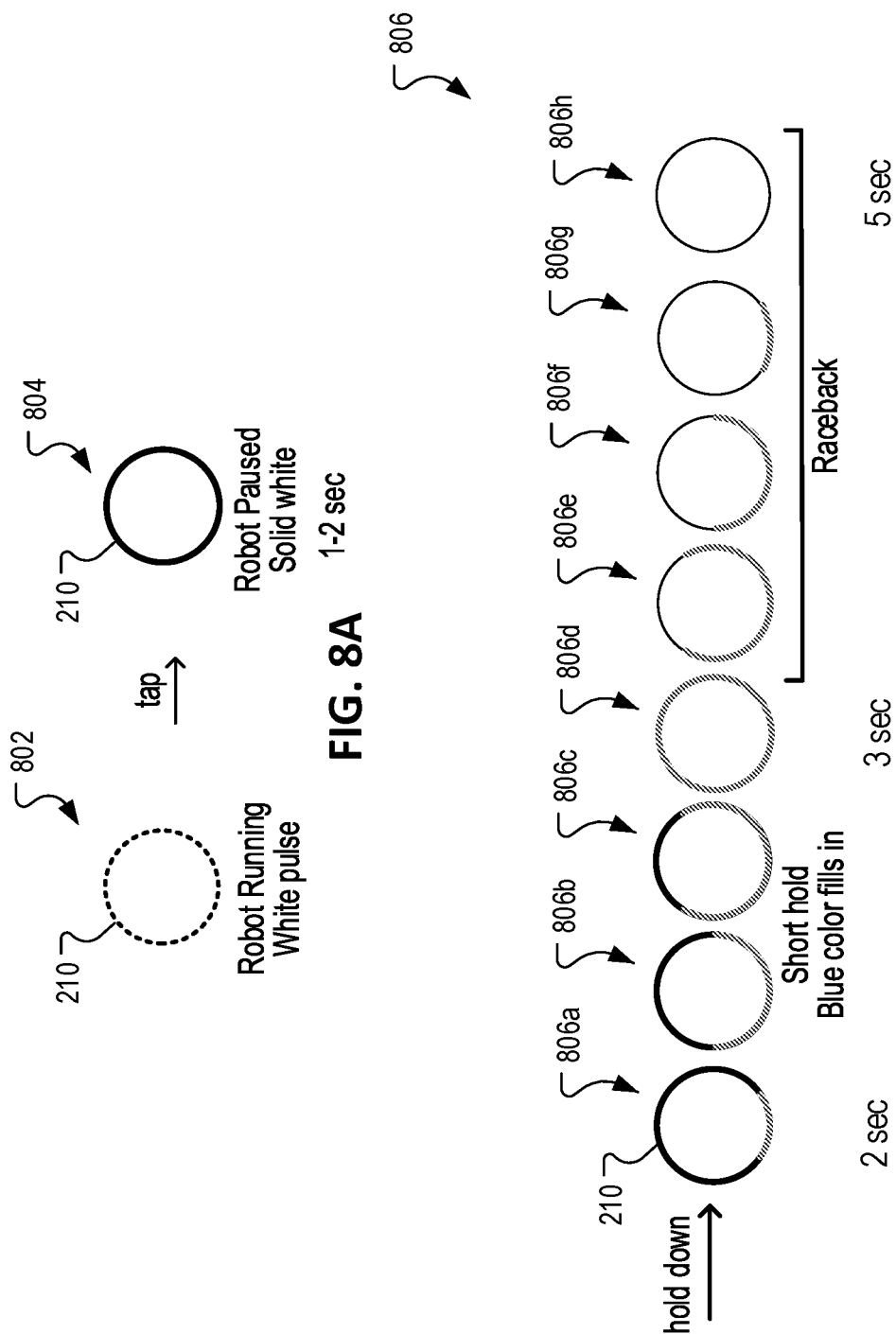

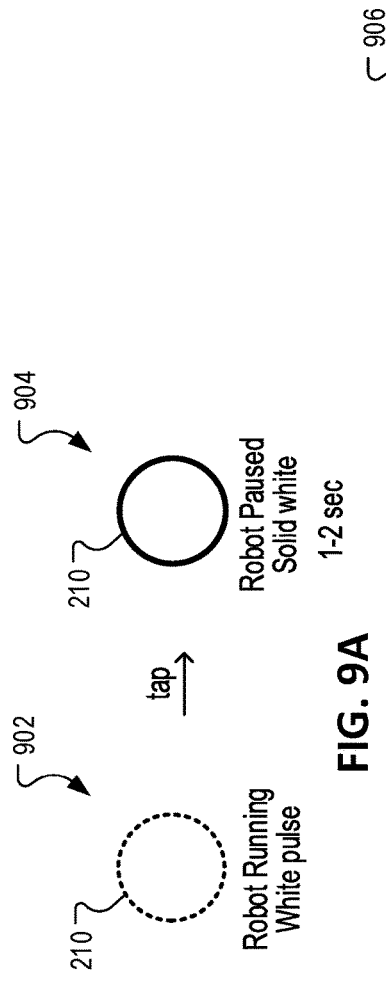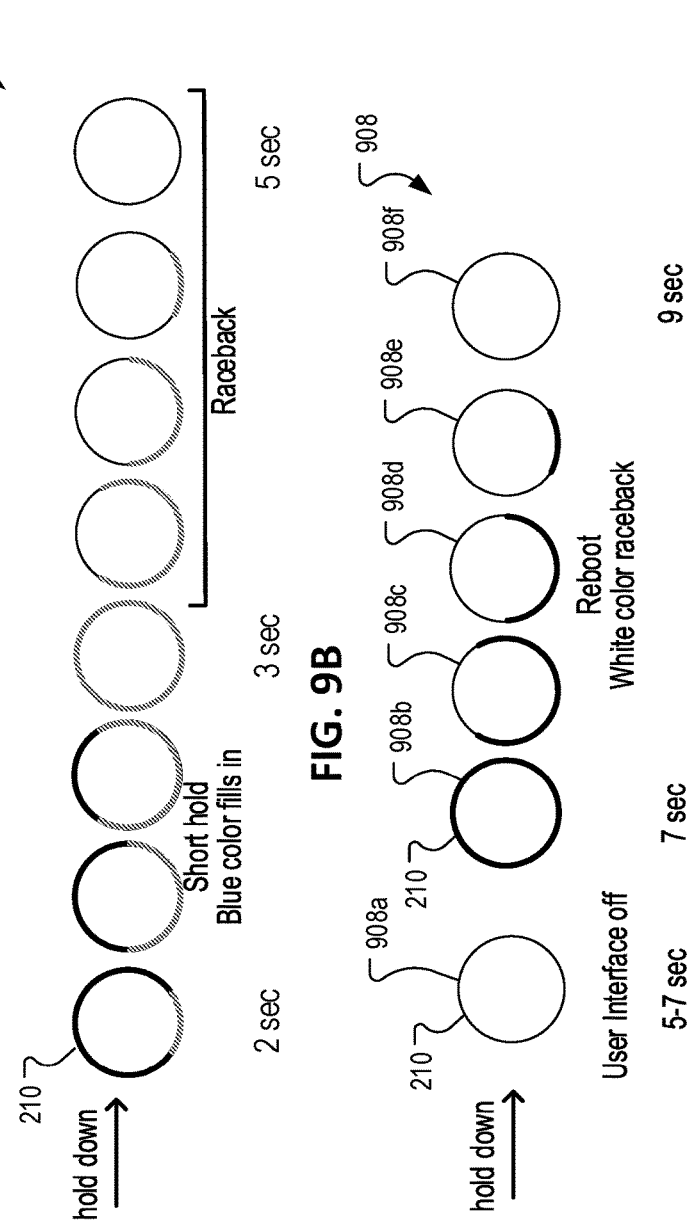

USER INTERFACES FOR AUTONOMOUS CLEANING ROBOTS

TECHNICAL FIELD

This specification relates to user interfaces for autonomous cleaning robots.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves.

SUMMARY

An autonomous mobile robot can clean a home during a cleaning mission, e.g., by vacuuming, mopping, or performing some other cleaning operation in the home. The robots described herein include a one-button user interface to allow users to interact with the robot and cause the robot to initiate different behaviors (e.g., begin cleaning, return to a docking station, etc.). In particular, the one-button user interface provides a multi-function button that can be operated in different ways to cause the robot to initiate different behaviors. For example, by distinguishing between different button states (e.g., on vs. off), a duration of time that the button is held in a particular state (e.g., by a user pressing the button), and/or a sequence of button actuations, the robot can select a desired behavior of the robot. In some examples, if a user presses and releases the button within 2 seconds, a first behavior is performed by the robot (e.g., resume a cleaning job), while if the user presses and releases the button for 2-5 seconds a second, different, behavior is performed by the robot (e.g., cancel the cleaning job). In these examples, the robot selects the behavior based on the duration of the actuation of the button and initiates the behavior.

Advantages of the implementations described in this disclosure may include, but are not limited to, those described below and elsewhere in this disclosure.

A one-button user interface can enable a simplified user experience compared to robots with 2, 3, or more buttons. For example, a user may be able to more intuitively operate a robot with a one-button user interface that includes one button as opposed to a user interface with multiple buttons.

A robot that selects a behavior of the robot based on a duration of the actuation of the button enables the robot to distinguish between short taps (e.g., less than 2 seconds), short holds (e.g., between 2-5 seconds), holds (e.g., at 7 seconds), and long holds (e.g., at 9 seconds). This feature can be combined with the state of the robot to distinguish between when the button is held for a certain period of time (e.g., regardless of whether the button is released) and when the button is held for a certain period of time and then released. This allows for a robot to select from multiple behaviors from operation of a single button and further allows for an increased number of behaviors that can be selected by the robot compared to user interfaces that do not account for both state of the actuation and duration of the actuation.

A robot that selects a behavior of the robot based on sensors of the robot enables the robot to distinguish from more behaviors. In addition to enabling the single button of the robot to be operated to initiate different behaviors, selecting the behavior based on the sensors also enables the robot to utilize sensors that are already on the robot for multiple purposes. This reduces weight of the robot and design complexity.

A robot that selects a behavior of the robot based on a current state of the robot further increases the number of behaviors that can uniquely be selected by the robot. By accounting for the current state of the robot to select the behavior to be initiated, the robot can be operated by a user in a more intuitive fashion. For example, the current state of the robot can be indicative of a condition of the robot that is observable (e.g., a docked state, an idle state, a moving state, or other user-observable state, etc.), and the selected behavior can intuitively correspond to the observed condition so that the behavior of the robot in response to user actuation of the button is intuitive to the user. This can also be expanded such that the robot selects a behavior based on whether the robot is docked on a docking station and/or a current battery state of the robot.

A one-button user interface combined with a light ring of the robot that provides visual feedback to the user enables the robot to indicate to the user when a certain threshold is about to be reached. For example, as a proportion of the light ring is illuminates, the user may be more inclined to continue holding the button until the entire light ring is illuminated. This provides a visual indication to a user of the different timing thresholds for the button duration (e.g., 2 seconds, 3 seconds, 5 seconds, 7 seconds, etc.) so that, for example, the user knows when they are providing a short tap, a short hold, a hold, or a long hold.

In one aspect, an autonomous cleaning robot includes a drive configured to maneuver the autonomous cleaning robot about a floor surface. The autonomous cleaning robot includes a cleaning system to clean the floor surface as the autonomous cleaning robot is maneuvered about the floor surface. The autonomous cleaning robot includes a robot button positioned on the autonomous cleaning robot. The autonomous cleaning robot includes a controller in electrical communication with the drive and the robot button. The controller is configured to perform operations including selecting a behavior of the autonomous cleaning robot from a plurality of behaviors of the autonomous cleaning robot responsive to a duration of actuation of the robot button. The controller is configured to perform operations comprising causing the autonomous mobile robot to initiate the behavior.

In another aspect, a method of operating an autonomous cleaning robot includes receiving, by a processor of an autonomous cleaning robot, information generated from one or more sensors of the autonomous cleaning robot. The method includes selecting, by the processor, a behavior of the autonomous cleaning robot from a plurality of behaviors of the autonomous cleaning robot based on at least a duration of actuation of a robot button of the autonomous cleaning robot and the information. The method includes generating, by the processor, a control signal based on the behavior. The method includes causing the autonomous mobile robot to initiate the behavior using the control signal.

In another aspect, a non-transitory computer-readable storage medium includes at least one program for execution by a processor of an autonomous cleaning robot. The at least one program includes instructions which, when executed by the processor, cause the autonomous cleaning robot to perform operations including selecting, by the processor, a behavior of the autonomous cleaning robot from a plurality of behaviors of the autonomous cleaning robot based on at least a duration of actuation of a robot button of the autonomous cleaning robot. The at least one program includes instructions which, when executed by the processor, cause the autonomous cleaning robot to perform operations including generating, by the processor, a control signal based on the behavior. The at least one program includes instructions which, when executed by the processor, cause the autonomous cleaning robot to perform operations including causing the autonomous cleaning robot to initiate the behavior using the control signal.

In some implementations, selecting the behavior from the plurality of behaviors of the autonomous cleaning robot comprises selecting among at least three different behaviors of the autonomous cleaning robot.

In some implementations, selecting the behavior from the plurality of behaviors of the autonomous cleaning robot is further based on sensor information generated from one or more sensors of the autonomous cleaning robot, the sensor information being independent from the actuation of the robot button. In some cases, the sensor information represents one or more of: an actuation of a bumper of the autonomous cleaning robot, a position of a wheel of the drive of the autonomous cleaning robot, a presence of a bin attached to the autonomous cleaning robot, or whether the autonomous cleaning robot is docked with a docking station.

In some implementations, selecting the behavior from the plurality of behaviors of the autonomous cleaning robot is further based on one or more current states of the autonomous cleaning robot, the one or more current states comprising one or more of the following states: a sleep state, an awake state, an idle state, a cleaning state, a docking state, a child-lock behavior state, or a reboot state.

In some implementations, selecting the behavior from the plurality of behaviors of the autonomous cleaning robot is further based on a sequence of the actuation of the robot button, the sequence comprising a number of times the robot button is actuated within a time interval.

In some implementations, the plurality of behaviors comprise a first behavior of the autonomous cleaning robot and a second behavior of the autonomous cleaning robot, wherein selecting the behavior comprises selecting the behavior based on the duration such that the selected behavior corresponds to the first behavior if the robot button is actuated for a first duration and the selected behavior corresponds to the second behavior if the robot button is actuated for a second duration longer than the first duration.

In some implementations, the robot button comprises a light ring configured to illuminate a portion of a top surface of the autonomous cleaning robot, wherein the controller is configured to control a length of the illuminated portion based on the duration of the actuation of the robot button.

In some implementations, the controller is further configured to perform operations including receiving information generated from one or more sensors of the autonomous cleaning robot. In some cases, selecting the behavior from the plurality of behaviors of the autonomous cleaning robot can be further based on the information. In some cases, the information represents at least one of: an actuation of a bumper of the autonomous cleaning robot, a position of a wheel of the drive of the autonomous cleaning robot, a presence of a bin attached to the autonomous cleaning robot, or whether the autonomous cleaning robot is docked with a docking station.

In some implementations, the plurality of behaviors include behaviors associated with one or more of the following states: a sleep state, an awake state, a cleaning state, a docking state, a child-lock behavior, and a reboot state.

In some implementations, the selected behavior corresponds to a first behavior if the robot button is actuated for a first duration, and the selected behavior corresponds to a second behavior if the robot button is actuated for a second duration longer than the first duration. In some cases, the first duration is less than 2 seconds and/or the second duration is between 2 and 5 seconds.

In some implementations, selecting the behavior from the plurality of behaviors of the autonomous cleaning robot is further based on one or more current states of the autonomous cleaning robot. In some cases, the one or more current states include at least one of: a sleep state, an awake state, an idle state, a cleaning state, a docking state, a child-lock behavior, or a reboot state.

In some cases, when the one or more current states include an awake state and a docked state, the first behavior is a cleaning behavior and the second behavior is an evacuation behavior.

In some cases, the cleaning behavior is associated with starting a cleaning job and/or the evacuation behavior associated with evacuating a bin of the autonomous cleaning robot.

In some cases, when the one or more current states include an awake state and an idle state, the first behavior is a cleaning behavior and the second behavior is a docking behavior, the docking behavior associated with a return of the autonomous cleaning robot to a docking station.

In some implementations, selecting the behavior from the plurality of behaviors of the autonomous cleaning robot is further based on a number of times the robot button is actuated within a time interval.

In some implementations, selecting the behavior from the plurality of behaviors of the autonomous cleaning robot is further based on a sequence of actuation of the robot button.

In some implementations, the autonomous cleaning robot includes a bumper and a bumper sensor configured to generate a signal in response to actuation of the bumper. In some cases, selecting the behavior from the plurality of behaviors of the autonomous cleaning robot is further based on the signal. In some cases, the plurality of behaviors includes a first behavior and a second behavior. In some cases, the selected behavior corresponds to the first behavior if the robot button is actuated for a first duration and the selected behavior corresponds to the second behavior if the robot button is actuated for a second duration.

In some cases, the first behavior is associated with a sleep state of the autonomous cleaning robot and the second behavior is associated with a docked state of the autonomous cleaning robot.

In some implementations, the drive includes a wheel movable between a first position in which the wheel is extended relative to a bottom surface of the autonomous cleaning robot and a second position in which the wheel is retracted relative to the bottom surface of the autonomous cleaning robot. In some cases, selecting the behavior from the plurality of behaviors of the autonomous cleaning robot is further based on a position of the wheel.

In some cases, only when the position of the wheel corresponds to the first position, the plurality of behaviors includes a first behavior and a second behavior. In some cases, the selected behavior corresponds to the first behavior if the robot button is actuated for a first duration once within a time interval. In some cases, the first duration is 3 seconds and/or the time interval is 5 seconds. In some cases, the selected behavior corresponds to the second behavior if the robot button is actuated a predetermined number of times within the time interval. In some cases, the predetermined number of times is 3 times.

In some cases, the first behavior is associated with powered-off behavior and the second behavior is associated with child-lock behavior.

In some implementations, the autonomous cleaning robot includes a bin removably attached to the autonomous cleaning robot and a bin sensor configured to generate a signal in response to a presence of the bin attached the autonomous cleaning robot. In some cases, selecting the behavior from the plurality of behaviors of the autonomous cleaning robot is further based on the signal.

In some cases, the selected behavior is a reset behavior if a bin is attached to the autonomous cleaning robot and the robot button is actuated for a first duration followed by a second actuation of the robot button. In some cases, the selected reset behavior is associated with a factory reset of the autonomous cleaning robot. In some cases, the first duration is 7 seconds.

In some implementations, the controller is further configured to perform operations including receiving a signal generated in response to the autonomous cleaning robot being docked in a docking station. In some cases, selecting the behavior from the plurality of behaviors of the autonomous cleaning robot is further based on the signal. In some cases, the behavior is associated with evacuating a bin of the autonomous cleaning robot. In some cases, the duration is between 2 and 5 seconds.

In some implementations, initiating the behavior includes initiating the behavior in response to a release of the actuation of the robot button.

In some implementations, initiating the behavior includes initiating the behavior prior to a release of the actuation of the robot button.

In some implementations, initiating the behavior includes setting a current state of the autonomous cleaning robot to be an awake state in response to the current state of the autonomous cleaning robot being a sleep state and in response to the actuation of the robot button.

In some implementations, the controller is further configured to perform operations including receiving information regarding a current state of the autonomous cleaning robot. In some cases, selecting the behavior of the autonomous cleaning robot is further based on the current state.

In some implementations, the autonomous cleaning robot has a single button corresponding to the robot button.

In some implementations, the robot button includes a light ring configured to illuminate a portion of a top surface of the autonomous cleaning robot. In some cases, the controller is configured to control a length of the illuminated portion based on the duration of the actuation of the robot button.

In some implementations, the autonomous cleaning robot includes a light ring configured to illuminate a portion of a continuous annular surface positioned around the robot button. In some cases, the controller is configured to control a length of the illuminated portion based on the duration of the actuation of the robot button.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 7A is a schematic of a light ring of the autonomous cleaning robot of FIG. 1 transitioning from an awake state to initiating a mission.

FIG. 7B is a schematic of a light ring of the autonomous cleaning robot of FIG. 1 transitioning from a mission state to returning to a docking station.

FIGS. 8A and 8B are schematics of a light ring of the autonomous cleaning robot of FIG. 1 during a transition from an active state to returning to a docking station.

FIGS. 9A-9C are schematics of a light ring of the autonomous cleaning robot of FIG. 1 during a rebooting transition.

DETAILED DESCRIPTION

An autonomous cleaning robot can autonomously perform cleaning operations to clean a floor surface. The cleaning robot can initiate multiple different behaviors. For example, the behaviors can include a cleaning behavior in which the robot autonomously moves about the floor surface to clean the floor surface, a docking behavior in which the robot moves back to its docking station, an idle behavior in which electronics of the robot are active but the robot is stationary, and other behaviors described in this disclosure. The robot can include a button that can be operated to initiate multiple different behaviors. As described herein, in response to one or more actuations of the button (e.g., by a user), the robot can identify which behavior should be initiated based on a characteristic of an actuation (e.g., a duration of time, whether the button is depressed or released, etc.) of the one or more actuations, a sequence of actuations (e.g., a number of times the button is actuated within a time interval) of the one or more actuations, and/or information collected from sensors on the robot.

Figure 1A:
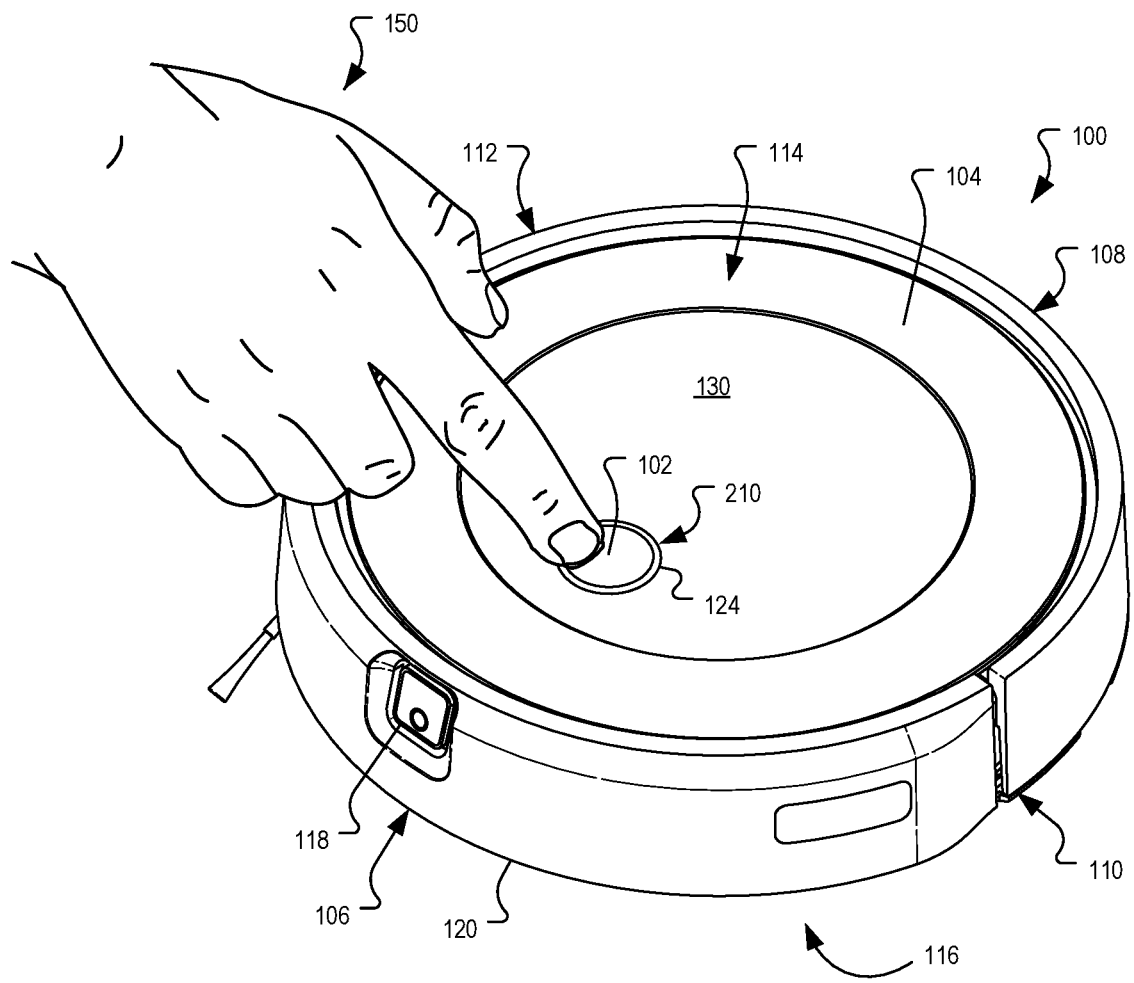
FIG. 1A is a perspective view of a user interacting with a button on an autonomous cleaning robot.
Figure 1B:
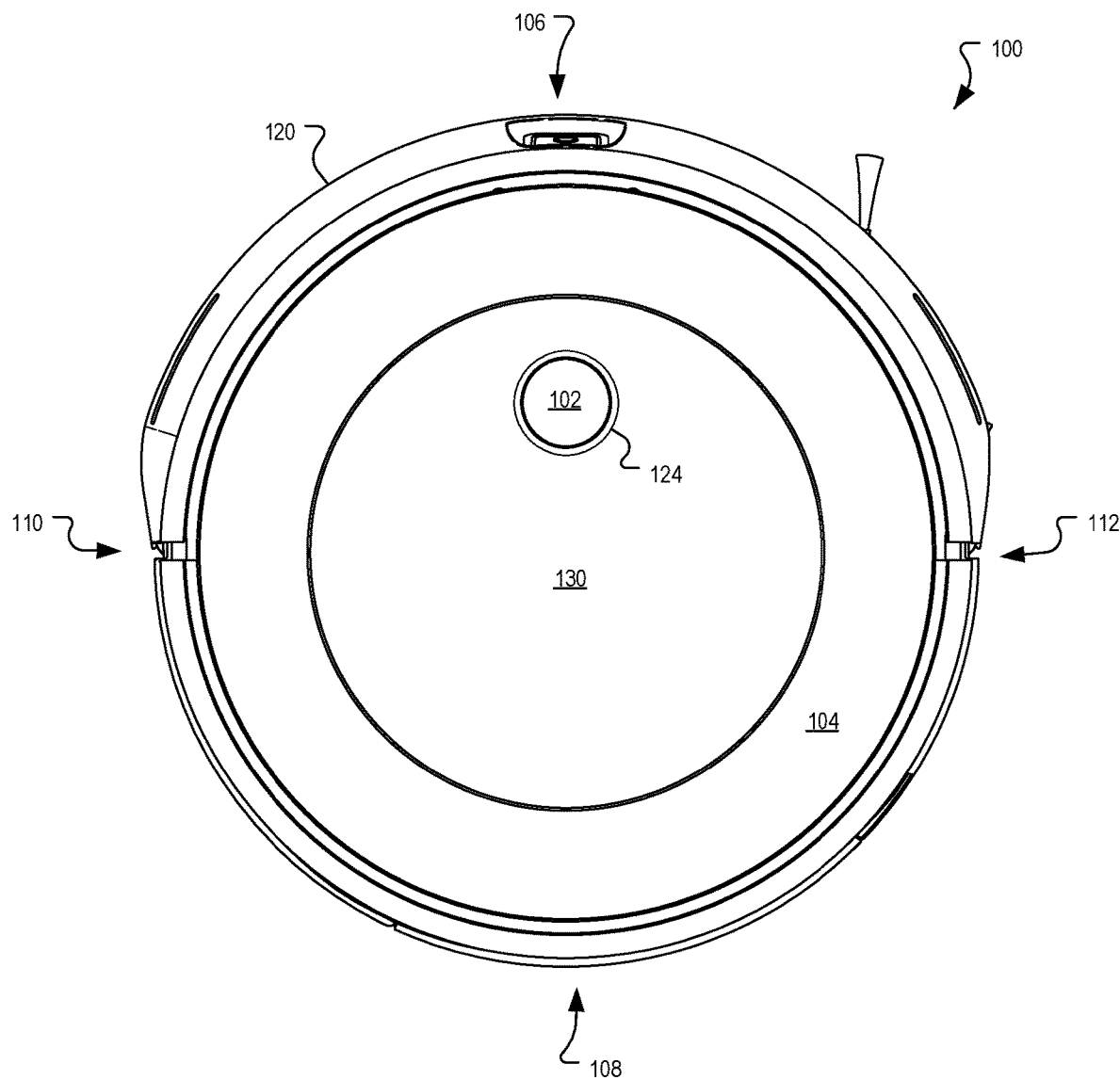
FIGS. 1B-1D are top, side, and bottom views of the autonomous cleaning robot of FIG. 1.

Referring to FIGS. 1A and 1B, a robot 100 (e.g., an autonomous cleaning robot) includes a body with a one-button user interface (e.g., a button 102). In some implementations, the button 102 is configured as a toggle switch with two states (e.g., an actuated (e.g., depressed state) and an unactuated (e.g., released state)). In other implementations, the button 102 has more than two states (e.g., a soft press state, a hard press state, a released state, etc.). In this way, the button 102 can be pressed by a user 150 to cause the robot 100 to initiate different behavior. Details about actuating the button 102 to cause the robot 100 to initiate behavior is described with reference to FIG. 4 below. In the implementation shown, the robot 100 has a single button corresponding to button 102. In this way, a single button is operated to initiate multiple different behaviors of the robot 100, as described in further detail below.

Generally, the robot 100 has a front side 106, a back side 108, a left-hand-side 110, a right-hand-side 112, a top 114, and a bottom 116 (or underside). The body of the robot 100 is circular-shaped such that an outer perimeter of the robot 100 is circular. However, square-shaped or other shaped robot bodies are used in other implementations.

In the implementations represented in FIGS. 1A and 1B, the button 102 is positioned on a top surface 104 of the robot 100. In particular, the button 102 is positioned within a central portion 130 of the top surface 104. The button 102 is oriented vertically such that a central axis of the button 102 is perpendicular to the top surface 104. The button 102 is also mounted flush with the central portion 130. In other implementations, the button 102 can be positioned on a different face of the robot 100 (e.g., the side of the robot 100).

The robot 100 represented in FIGS. 1A and 1B also includes a light indicator 210. The light indicator 210 includes a housing 124 that is mounted flush with the button 102 and the central portion 130. The housing 124 is shaped as a ring around the button 102 and spans an entire circumference (e.g., 360°) of the button 102. A plurality of lights are mounted inside the housing 124 and are individually controllable by a controller of the robot 100 to individually illuminate and transmit light through a translucent portion of the housing 124. In this way, the light indicator 210 is configured as a light ring and illuminates to provide visual indication to the user 150 of the robot 100.

In some implementations, the plurality of lights of the light indicator 210 define a ring of equally spaced 8 multi-color light emitting diodes (LEDs). In this scenario, the LEDs are mounted on a circuit board that is mounted inside the housing 124. In some examples, the LEDs are individually controllable such that the robot 100 can illuminate a portion of the light indicator 210 based on a current state of the robot 100 and/or the actuation of the button 102. In some examples, the light indicator 210 is configured to illuminate white, blue, red, and green. Further details about the light indicator 210 and coordination of illumination of the light indicator 210 with operation of the button 102 are described with reference to FIGS. 7A-9C below.

In some implementations, the robot 100 includes a camera 118 positioned near the front side 106 of the robot 100 that allows the robot 100 to image the environment of the robot 100. In some implementations, the robot 100 processes the image information and determines control for the robot 100 based on the image information (e.g., obstacle avoidance). In some implementations, the camera 118 includes a range sensor to generate information indicative of a distance from the robot 100 to one or more obstacles in an environment of the robot.

In some implementations, the robot 100 includes a bumper 120 that can be actuated by a force of a collision when the robot 100 encounters an obstacle. In some scenarios, a user can actuate the bumper 120 manually. The bumper 120 can include a bumper sensor configured to generate a bumper actuation signal in response to actuation of the bumper 120. In some examples, the bumper sensor includes a switch and in other implementations, the bumper sensor includes a capacitance, inductance, a Hall effect, or other sensor.

Figure 1C:
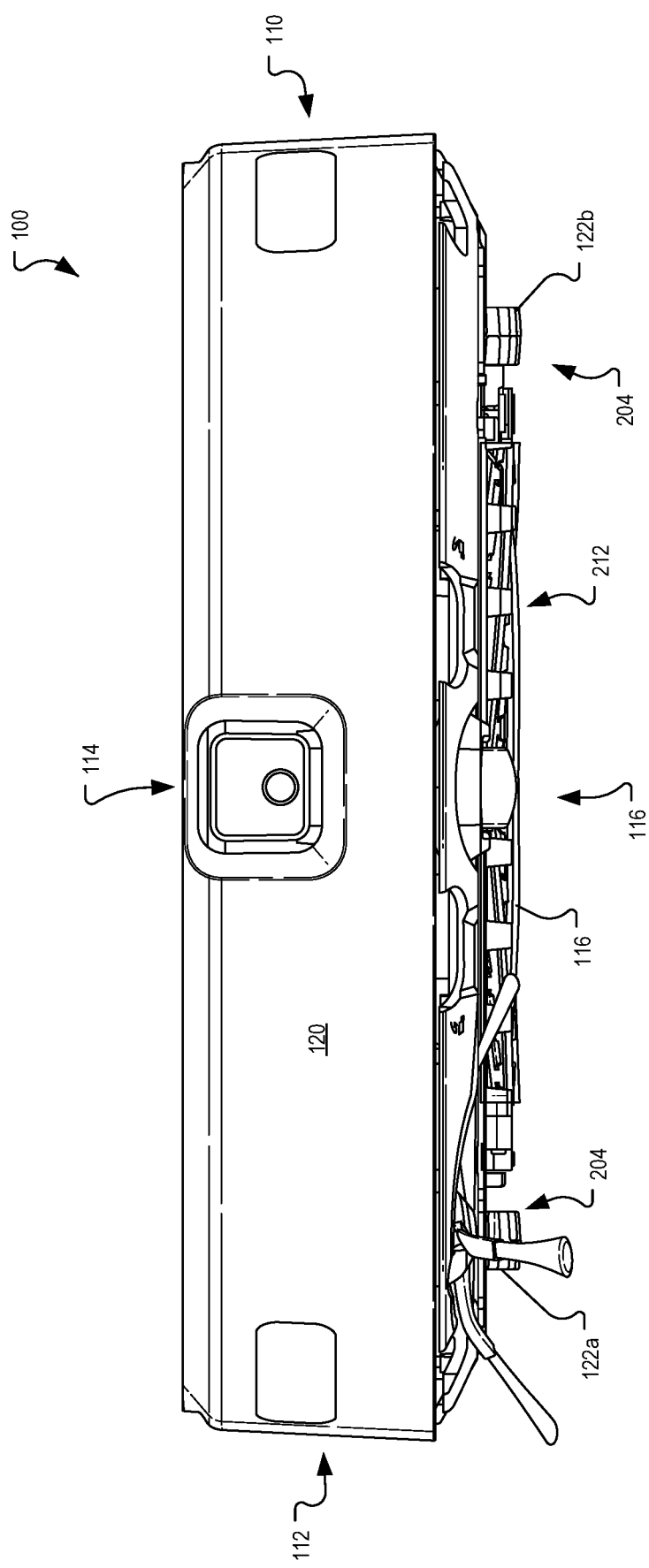
Figure 1D:
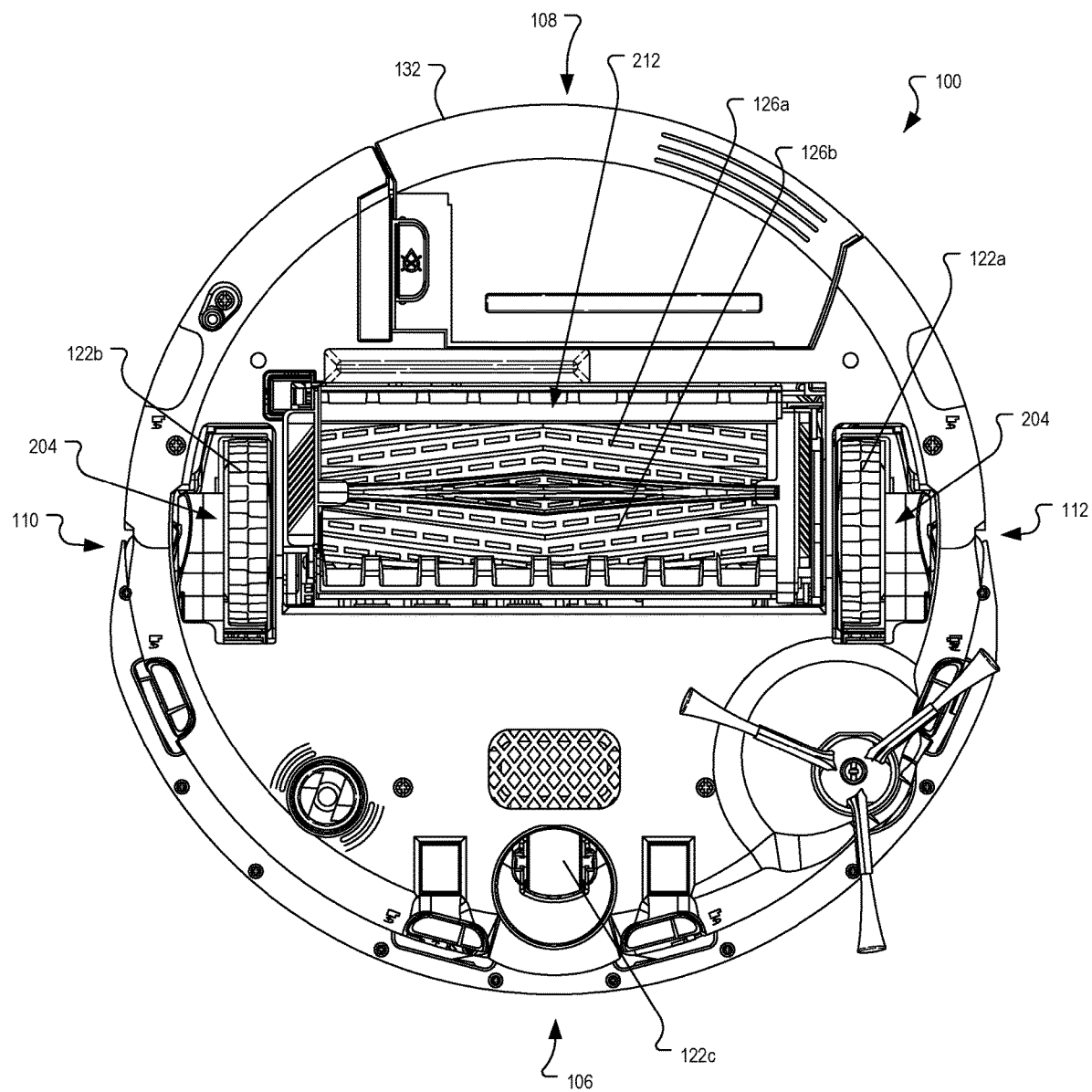

Referring to FIGS. 1C and 1D, the robot 100 includes a drive system 204 configured to maneuver the robot 100 about a floor surface. The drive system 204 includes two wheels 122a, 122b that are both rotatable to maneuver the robot 100 and also movable between a first position in which the wheels 122a, 122b are extended relative to a bottom surface of the robot 100 and a second position in which the wheels 122a, 122b are retracted relative to the bottom surface of the robot 100. In some implementations, wheel 122a and wheel 122b are independently movable between the first position and the second position. The robot 100 also includes a third wheel 122c which is an undriven caster wheel.

The drive system 204 includes drive wheel sensors to measure whether the wheels 122 are in the first position, the second position, or an in-between position. In some examples, the drive system 204 includes a drive wheel sensor associated with each wheel 122. In some examples, the drive wheel sensors include a switch or IR break beam sensor. In some examples, the wheels 122 are biased away from the robot 100 using one or more springs. Additionally, as described in further detail below, information generated by the drive wheel sensors can be used by a controller of the robot 100 to determine that a wheel is "off the ground" when the respective wheel is fully extended from the robot 100. Similarly, information generated by the drive wheel sensors can be used by the controller of the robot 100 to determine that a wheel is "on the ground" when the respective wheel is less than fully extended from the robot 100.

The robot 100 includes a cleaning system 212 to clean a floor surface underneath the robot 100. The cleaning system 212 cleans the floor as the robot 100 is maneuvered about the floor surface using the wheels 122a, 122b of the drive system 204 of the robot 100. In the implementations represented in FIGS. 1C and 1D, the cleaning system 212 includes rotatable rollers 126a, 126b and a vacuum system including a motor and an impeller to generate an airflow at a cleaning inlet between the rollers 126a, 126b. However, in other implementations, the cleaning system 212 can be a mopping system with a mop that faces the floor surface and scrubs the floor surface as the robot 100 is maneuvered about the floor surface.

In some implementations, the robot 100 includes a bin 132 removably attached to the robot 100. The bin 132 defines a volume where debris can be collected by the rollers 126a, 126b and the vacuum system of the cleaning system 212 and deposited into the bin 132. The robot 100 also includes a bin sensor configured to generate a bin attachment signal in response to a presence of the bin 132 being attached the robot 100.

Figure 10:
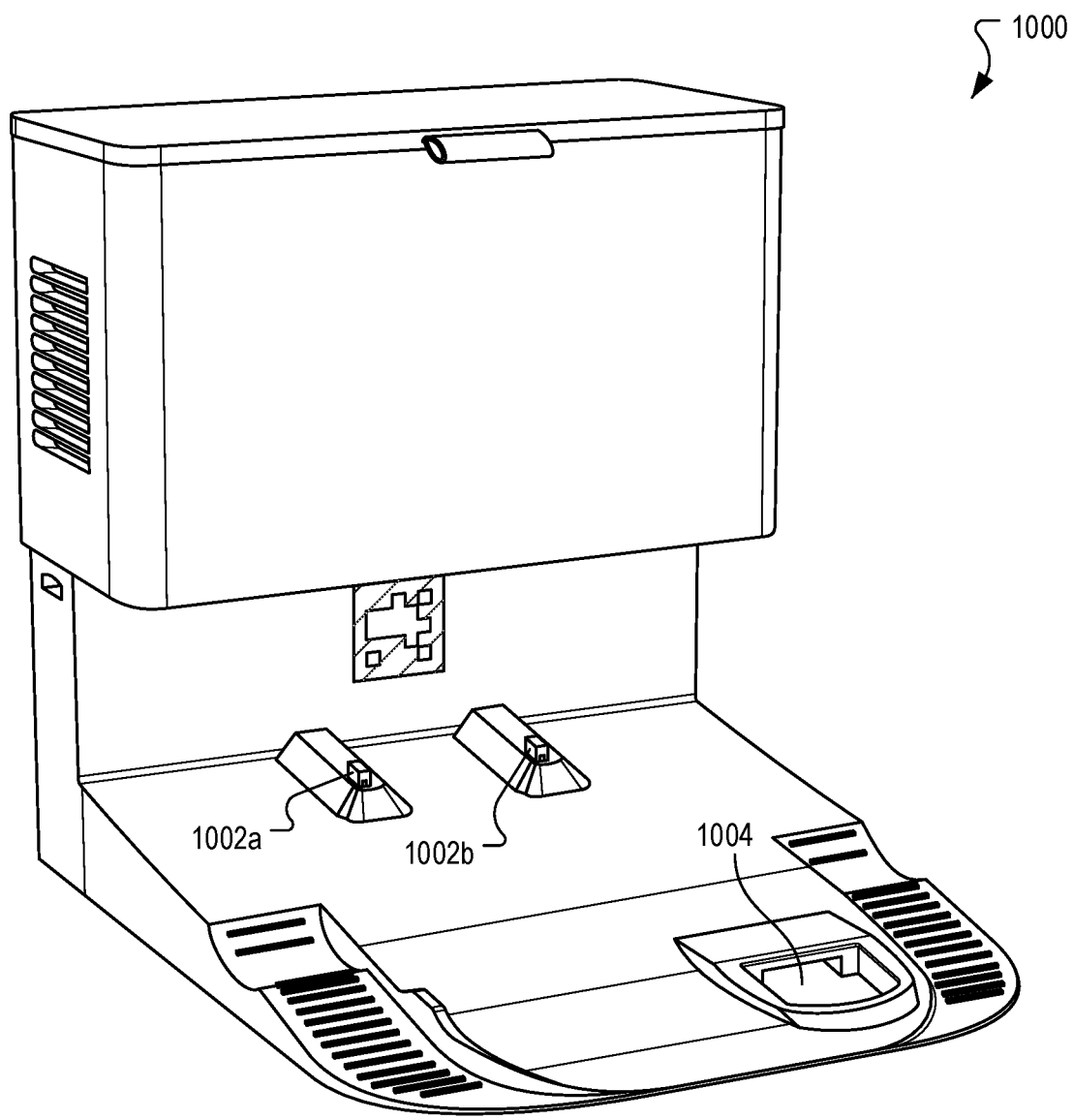
FIG. 10 is a perspective view of a docking station for the autonomous cleaning robot of FIG. 1.

In some implementations, the robot 100 can be docked in a docking station to evacuate the bin and to recharge the battery of the robot 100. For example, FIG. 10 shows an example of a docking station 1000 to which the robot 100 can dock. The docking station 1000 includes charging contacts 1002a, 1002b to mate with corresponding contacts of the robot 100 to charge the battery of the robot 100 and an evacuation port 1004 through which debris in the bin 132 of the robot 100 is evacuated into the docking station 1000.

Figure 2:
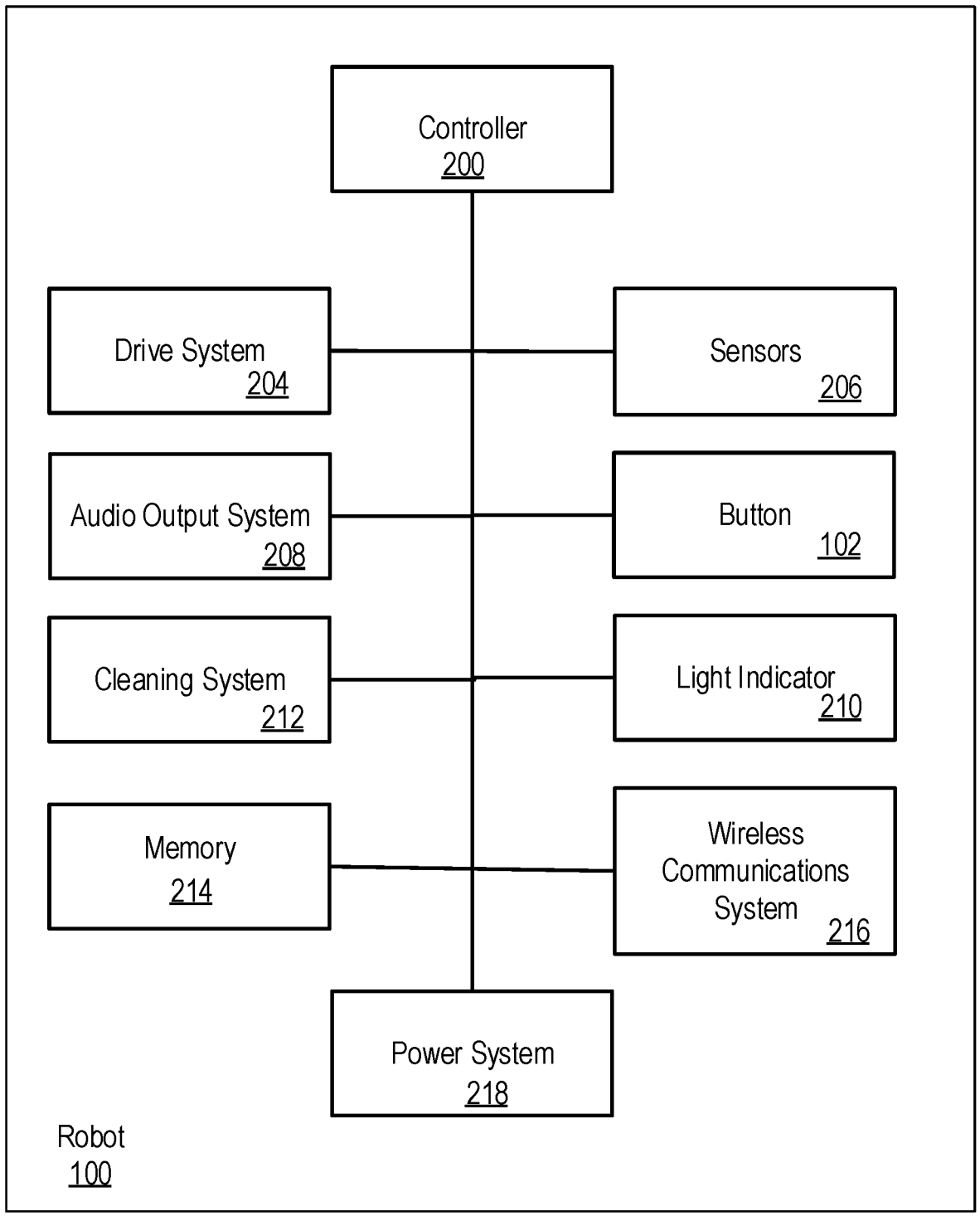
FIG. 2 is a schematic of the autonomous cleaning robot of FIG. 1.

Referring to FIG. 2, the robot 100 includes a controller 200 in electrical communication with the drive system 204, the sensors 206 (e.g., the bin attachment sensors, the wheel sensors, the bumper sensors, etc.), an audio output system 208 (e.g., one or more speakers of the robot 100), the button 102, the light indicator 210 (e.g., each of the plurality of lights of the light indicator 210), the cleaning system 212, non-transitory memory 214, a wireless-communication system 216 (e.g., transceivers of the robot 100), and a power system 218 (e.g., the batteries of the robot 100).

In some implementations, the controller 200 includes one or more processors configured to perform operations of the robot 100. For example, the controller 200 can perform the operations described with reference to method 300 below. In general, the non-transitory memory 214 is a non-transitory computer-readable storage medium that includes at least one program for execution by the processor of robot such that, when executed by the processor, cause the robot 100 to perform the operations described with reference to method 300 below.

Figure 3:
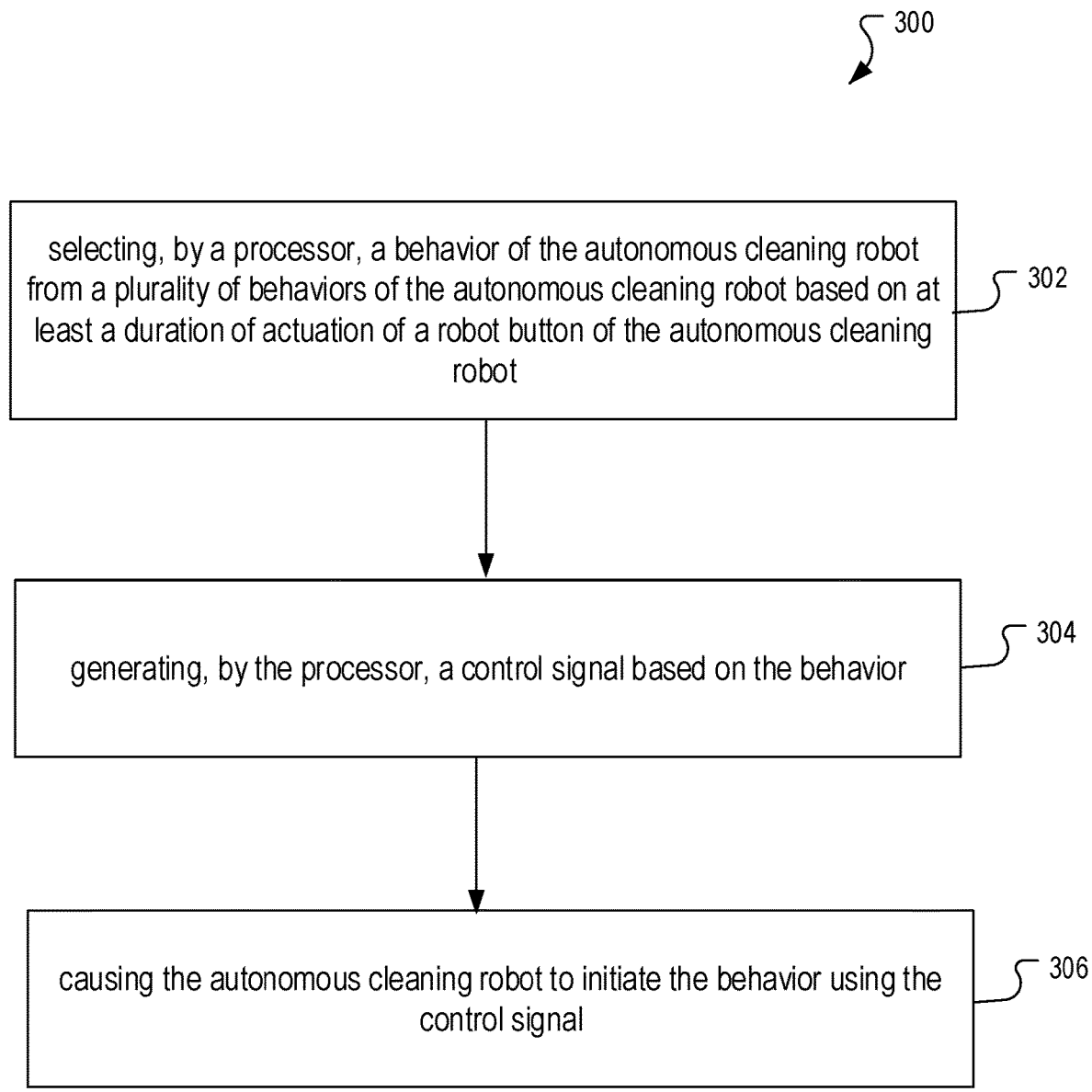
FIG. 3 is a flowchart of a process of selecting behavior of the autonomous cleaning robot of FIG. 1.

Referring to FIG. 3, the method 300 of operating the robot 100 can include selecting, at step 302, by a processor, a behavior of the autonomous cleaning robot from a plurality of behaviors of the autonomous cleaning robot based on at least a duration of actuation of a robot button of the autonomous cleaning robot. For example, the processor of the controller 200 of the robot 100 can select a behavior of the robot 100 (e.g., waking up the robot from a sleep state) from a plurality of behaviors of the robot 100 (e.g., waking up the robot from a sleep state, driving the robot to the docking station, initiating a cleaning mission, etc.) based on at least a duration of actuation of a button 102 of the robot 100.

Figure 4:
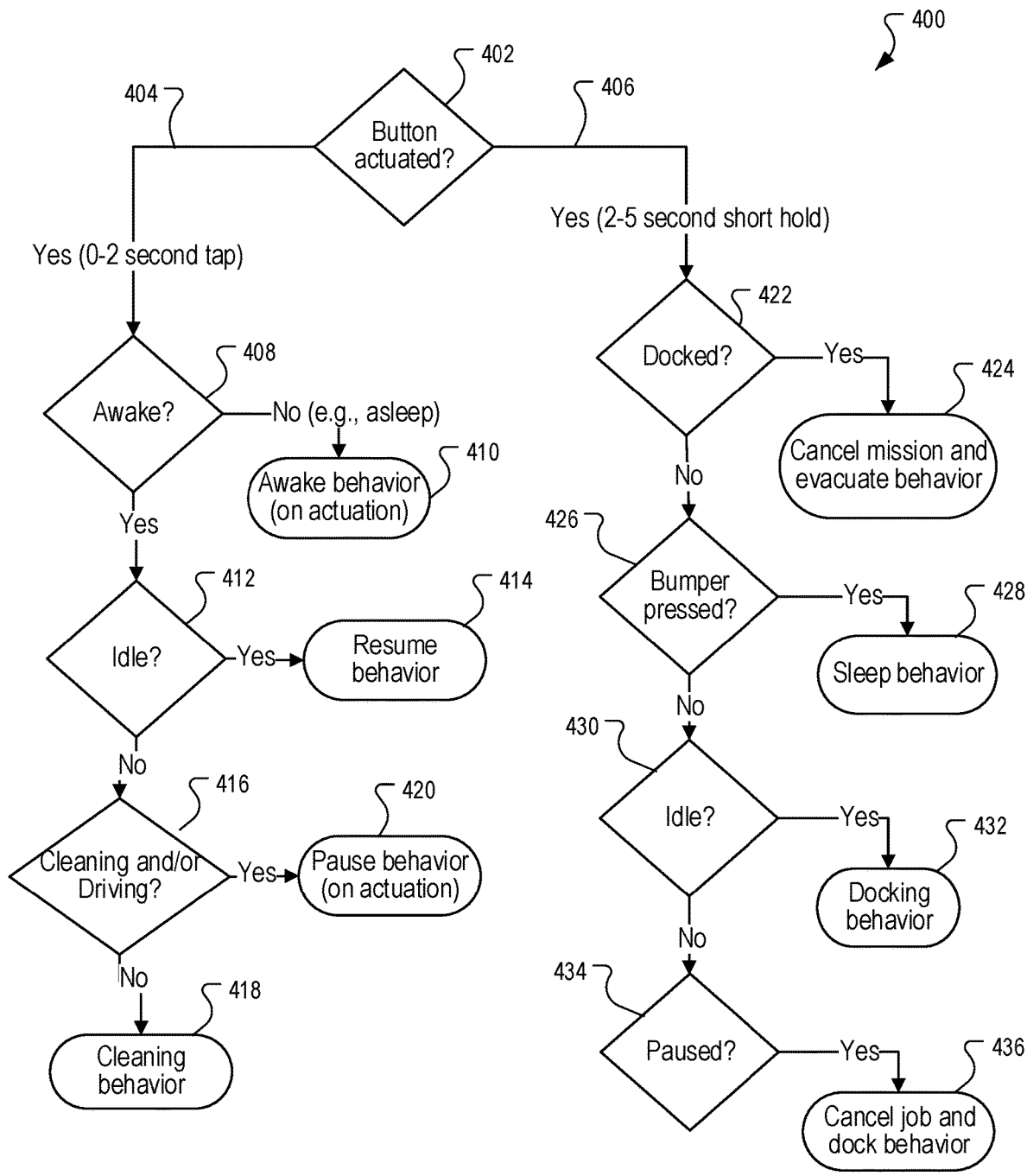
FIG. 4 is a flowchart of examples of selecting behavior of the autonomous cleaning robot of FIG. 1 based on a release of the button and a duration of the button actuation.
Figure 5:
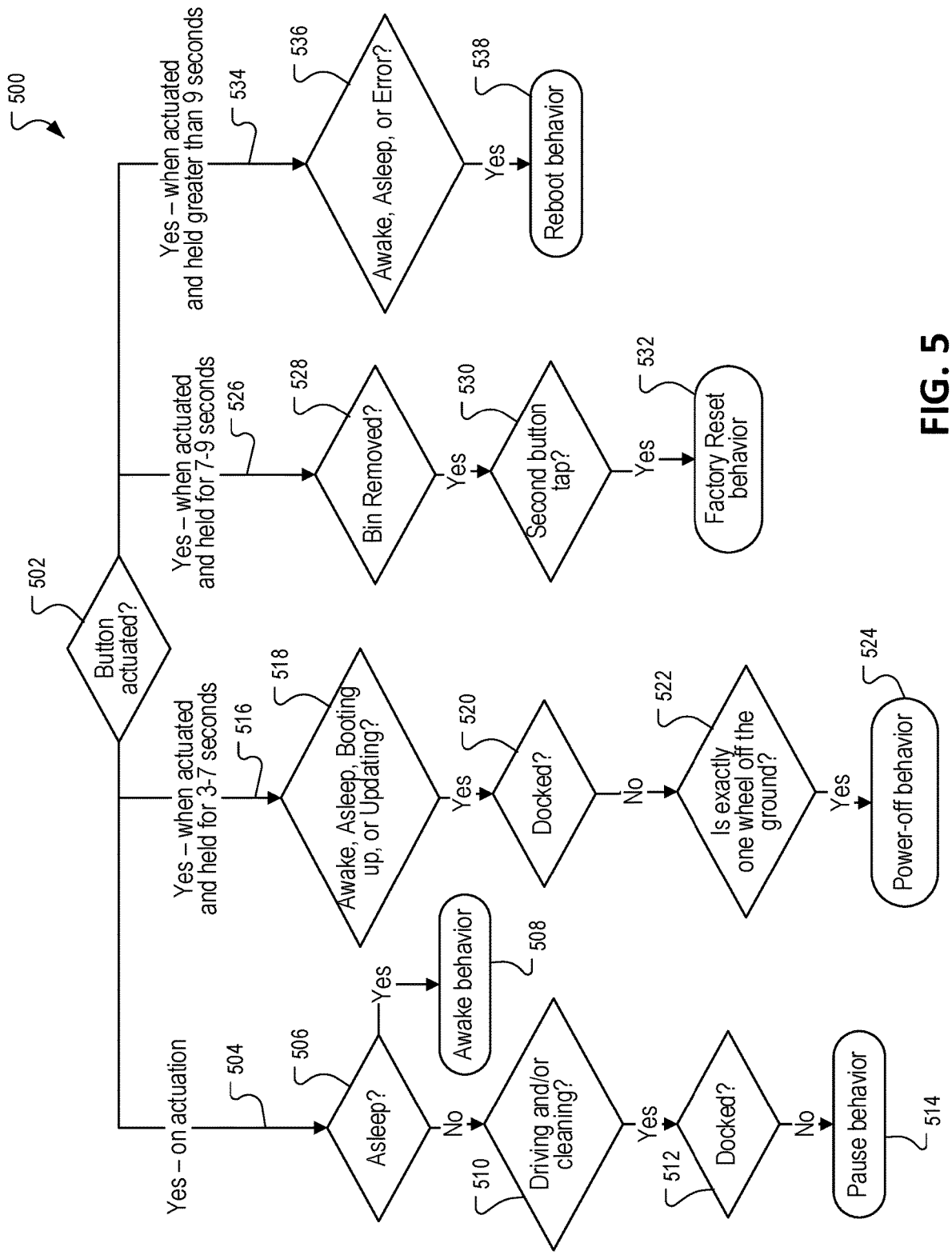
FIG. 5 is a flowchart of examples of selecting behavior of the autonomous cleaning robot of FIG. 1 based on a press of the button and a duration of the button actuation.
Figure 6:
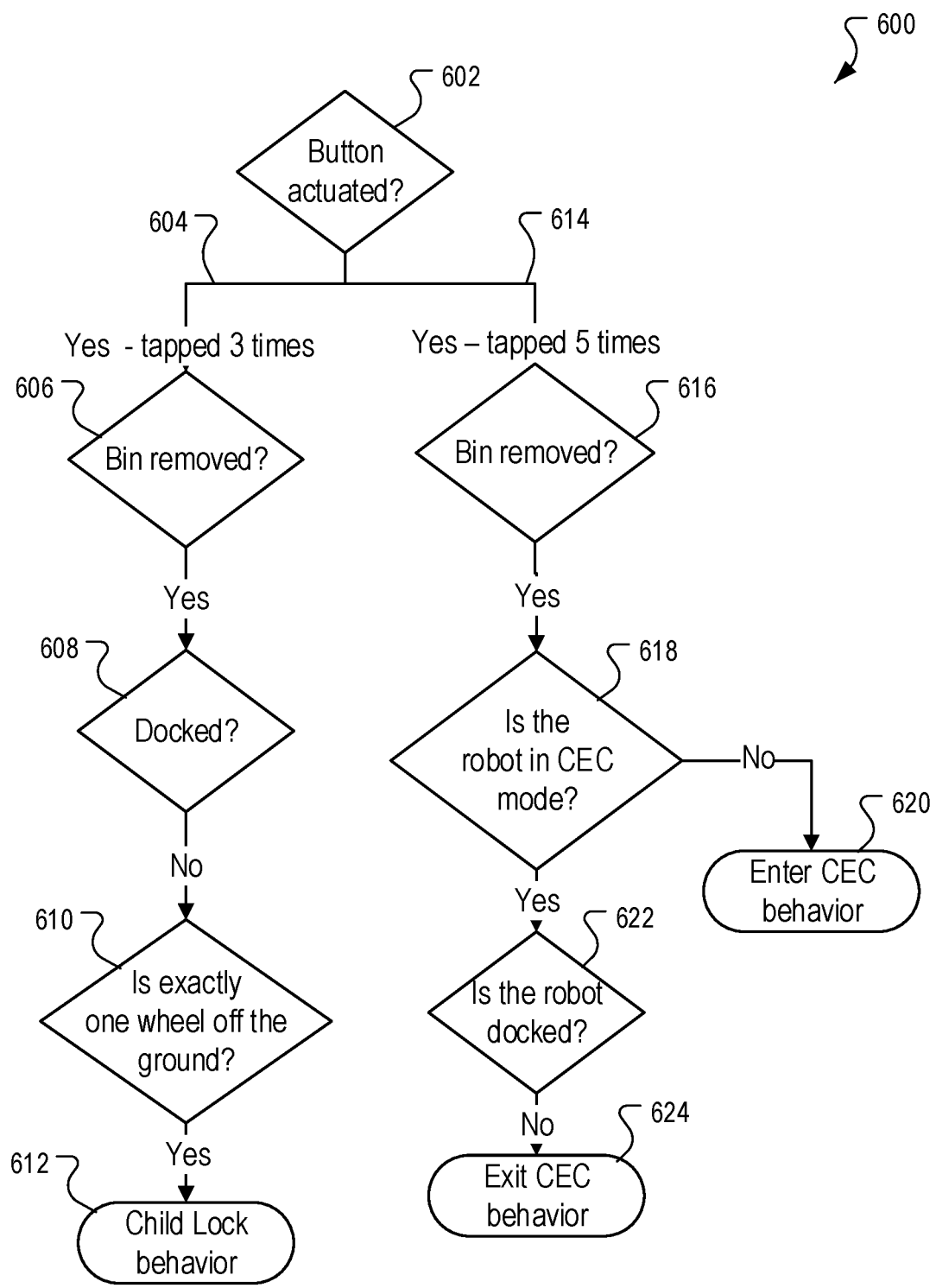
FIG. 6 is a flowchart of examples of selecting behavior of the autonomous cleaning robot of FIG. 1 based on a sequence of button actuations.

FIGS. 4-6 illustrate example scenarios of method 300. Referring to FIG. 4, a flowchart 400 of an example scenario for determining the behavior to initiate in response to actuation of the button 102 is presented. In this scenario, at step 402, a user actuates (e.g., presses) the button 102 for a duration of time (e.g., 2 seconds, 4 seconds, etc.). In some examples, the user 150 actuates the button 102 according to short taps (e.g., less than 2 seconds), short holds (e.g., between 2-5 seconds), holds (e.g., between 5-7 seconds), or long holds (e.g., more than 7 seconds). However, in other examples, the specific times associated with taps, short holds, holds, and long holds can vary. Additionally, in some examples, more than four (or less than four) categories of user actuation can exist.

Depending on the duration of time the button 102 is actuated, the controller 200 proceeds to one of two different processes illustrated in the flowchart 400. In a scenario where the user 150 actuates the button 102 for a duration of time between 0-2 seconds (e.g., within 2 seconds) and then releases the button 102, the robot 100 proceeds to process 404. In a scenario where the user 150 actuates the button 102 for a duration of time between 2-5 seconds and then releases the button 102, the robot 100 proceeds to process 406.

The controller 200 then proceeds to select the behavior of the robot 100 based on one or more conditions of the robot 100. In some implementations, the one or more conditions include a current state of the robot 100 (e.g., an awake state, a sleeping state, a cleaning state, etc.), signals from one or more sensors of the robot 100 (e.g., sensors of the bumpers 120, sensors of the drive wheels 122a, 122b, sensors of the bin 132, etc.), and whether the robot 100 is currently docked in a docking station (e.g., the docking station 1000 described with reference to FIG. 10 above). In some examples, information reflecting whether the robot 100 is docked is included in a state (e.g., a docked state) and other times information can be received from a sensor of the docking station.

In some examples, the robot 100 is required to be in an awake state before the controller 200 can select the behavior of the robot 100. For example, if the robot 100 is asleep, then the first behavior selected will be to awake the robot 100. In particular, if the robot 100 is in a sleep state and the button 102 is actuated and released within 2 seconds of being actuated (e.g., the duration is less than 2 seconds), the controller 200 selects the behavior to be an awake behavior. In this scenario, the awake behavior can be associated with control signals that cause the robot 100 to awake from sleep.

In this way, the controller 200 can select the behavior based on a current state of the robot 100 and the duration of actuation of the button 102.

In another example, if the robot 100 is in an awake state and also in an idle state, and the button 102 is actuated and released within 2 seconds of being actuated (e.g., the duration is less than 2 seconds), the controller 200 selects the behavior to be a cleaning behavior. In this scenario, the cleaning behavior can be associated with control signals that cause the robot 100 to begin cleaning. In this way, the controller 200 can select the behavior based on more than one current state of the robot 100 and the duration of actuation of the button 102.

In another example, if the robot 100 is in a cleaning state and the button 102 is actuated and released (e.g., within 2 seconds of being actuated) while the robot 100 is not docked in a docking station, the controller 200 selects the behavior to be a pause behavior. In this scenario, the pause behavior can be associated with control signals that cause the robot 100 to pause the cleaning behavior. In this way, the controller 200 can select the behavior based on the current state of the robot 100, whether the robot 100 is docked, and the duration of actuation of the button 102.

Referring to process 404 of FIG. 4, if the button 102 is actuated for a short duration (e.g., a "short tap" of less than 2 seconds) and released, the controller 200 proceeds to determine, at step 408, if the robot 100 is in an awake state. If the robot 100 is not in an awake state, the controller 200 selects, at step 410, the behavior to be awake behavior. In this scenario, the awake behavior can be associated with control signals that cause the robot 100 to awake from sleep.

In some implementations, the controller 200 can also select the awake behavior immediately when the button 102 is actuated. For example, the controller 200 would first proceed to process 404 when the button 102 is actuated. If a behavior is associated with an "on actuation" state, then the controller 200 would immediately select that behavior. Otherwise, the controller 200 would wait until the user 150 has released the button 102 to determine the duration that the button 102 was held in the actuated state. In the example shown, the controller 200 selects the awake behavior (at step 410) when the button 102 is actuated regardless of the duration that the button 102 is held in an actuated state.

Continuing on, if the robot 100 is in an awake state, the controller 200 determines, at step 412, if the robot 100 is in an idle state. If the robot 100 is in an idle state, the controller 200 selects, at step 414, the behavior to be a resume behavior. In this scenario, the resume behavior can be associated with control signals that cause the robot 100 to resume a behavior. For example, the resume behavior can be associated with control signals that cause the robot 100 to resume a cleaning behavior (e.g., drive around and clean the floor) or resume a docking behavior (e.g., return to the docking station without cleaning the floor).

If the robot is not in an idle state, the controller 200 determines, at step 416, if the robot 100 is in a cleaning or driving state. If the robot 100 is not in a cleaning or driving state, the controller 200 selects, at step 418, the behavior to be cleaning behavior. In this scenario, the cleaning behavior can be associated with control signals that cause the robot 100 to begin a cleaning job. In other examples, selecting the cleaning behavior at step 418 can be replaced with selecting a docking behavior. In this scenario, the docking behavior can be associated with control signals that cause the robot 100 to drive to a docking station (e.g., to recharge, evacuate the bin 132, await further commands, etc.).

If the robot 100 is in a cleaning or driving state, the controller 200 selects, at step 420, the behavior to be a pause behavior. In this scenario, the pause behavior can be associated with control signals that cause the robot 100 to temporarily pause the cleaning or driving behavior and await further instructions from the controller 200. In this example, the controller 200 selects the pause behavior (at step 420) when the button 102 is actuated regardless of the duration that the button is held in an actuated state.

As reflected in the above examples, the controller 200 selects the behavior from a plurality of behaviors. These plurality of behaviors can include an awake behavior, a resume behavior, a pause behavior, a cleaning behavior, and additional behaviors as described below. In this way, the controller 200 can select the behavior among at least three different behaviors.

Still referring to FIG. 4, if the button 102 is actuated for a different duration of time, the controller 200 can select a different behavior based on the duration. In the example shown, the controller 200 proceeds to process 406 when the button 102 is actuated for a short hold duration (e.g., a "short hold" between 2-5 seconds) and released. In this scenario, the controller 200 proceeds to determine, at step 422, if the robot 100 is in a docked state.

If the robot 100 is not in a docked state, at step 424, the controller 200 cancels the current cleaning mission and then initiates an evacuation process. In this scenario, the cancel job and evacuate behavior can be associated with control signals that cause the robot 100 to cancel the current cleaning job and cause a docking station to evacuate debris from the bin 132 of the robot 100 into the docking station.

If the robot 100 is in a docked state, the controller 200 determines, at step 426, if the bumper 120 of the robot 100 is currently in an actuated state. If the bumper 120 is actuated, the controller 200 selects, at step 428, the behavior to be a sleep behavior. In this scenario, the sleep behavior can be associated with control signals that cause the robot 100 to enter a sleep state (e.g., from an awake state). For example, the sleep state can represent a low-power consumption state to preserve battery power of the robot 100. In such a state, the controller 200 can disable all sensors and systems of the robot (e.g., the drive system 204 can be disabled, the audio output system 208 can be disabled, the cleaning system 212 can be disabled, etc.) and instead only process signals generated by the button 102 to determine if robot 100 should be awoken from sleep. In some examples, the controller 200 controls the light indicator 210 while the robot 100 is in the sleep state as an indication to the user 150. Conversely, the awake state can represent a full-power state of the robot 100. In such a state, the controller 200 can enable all sensors and systems of the robot 100 (e.g., the drive system 204 is enabled, the audio output system 208 is enabled, the cleaning system 212 is enabled, etc.)

Continuing on, if the bumper 120 of the robot 100 is currently not in an actuated state, the controller 200 determines, at step 430, if the robot 100 is currently in an idle state. If the robot 100 is currently in an idle state, the controller 200 selects, at step 432, the behavior to be a docking behavior. In this scenario, the docking behavior can be associated with control signals that cause the robot 100 to return home to a docking station.

If the robot 100 is currently not in an idle state, the controller 200 determines, at step 434, if the robot 100 is currently in a paused state. If the robot 100 is currently in a paused state, the controller 200 selects, at step 436, the behavior to be a cancel job and dock behavior. In this scenario, the cancel job and dock behavior can be associated with control signals that cause the robot 100 to cancel any current cleaning jobs and return home to a docking station.

As noted above, the controller 200 can select the behavior of the robot 100 based on sensor information generated from one or more sensors 206 of the robot 100. In these scenarios, the sensor information can be independent from the actuation of the button 102.

In the examples described with reference to FIG. 4, the controller 200 can select a different behavior based on the duration of the button 102. For example, the controller 200 selects the behavior to be a resume behavior (at step 414) when the button 102 is actuated for less than 2 seconds and released. Conversely, the controller 200 selects the behavior to be a docking behavior (at step 432) when the button 102 is actuated for between 2 and 5 seconds and released. In this way, the controller 200 can select either a first behavior (e.g., resume) or a second behavior (e.g., docking) based on the duration of the button 102 actuation.

FIG. 5 is a flowchart 500 of additional example scenarios. In particular, FIG. 5 illustrates further examples of "on actuation" events described above with reference to FIG. 4. As described above, the controller 200 can immediately select these behaviors when certain conditions are satisfied regardless of whether the user is holding the button 102 in an actuated state.

The first scenario described with reference to FIG. 5 is an immediate "on actuation" event, as described above with reference to FIG. 4. In this scenario, at step 502, as soon as a user 150 actuates (e.g., presses) the button 102, the controller 200 proceeds to process 504 and determines, at step 506, if the robot 100 is in an asleep state. If the robot 100 is in an asleep state, the controller 200 immediately selects, at step 508, the behavior to be an awake behavior. If the robot 100 is not in an asleep state, the controller 200 determines, at step 510, if the robot 100 is cleaning and/or driving. If the robot 100 is cleaning and/or driving, the controller 200 proceeds to determine, at step 512, if the robot 100 is docked. If the robot 100 is docked, the controller 200 immediately selects, at step 514, the behavior to be a pause behavior.

The second scenario described with reference to FIG. 5 is performed as soon as the button 102 is actuated for a duration of 3 seconds. In this scenario, at step 502, when the user 150 actuates and holds the button 102 for 3 seconds, the controller 200 proceeds to process 516. While the controller 200 immediately proceeds to process 516 as soon as the button 102 is maintained in the actuated state for 3 seconds, the controller 200 continues to reevaluate the conditions associated with process 516 during a 3-7 second window. For example, conditions at steps 518, 520, 522 (described below) are continuously reevaluated during the 3-7 second window of time if the button 102 is maintained in an actuated state during this same time. Once the button 102 is maintained in the actuated state for more than 7 seconds, the controller 200 proceeds to process 526 (described below) instead of process 516.

Referring back to process 516, the controller 200 determines, at step 518, if the robot 100 is currently in one or more states. These states can include an awake state, an asleep state, a booting-up state, and an updating software state. If the robot 100 is in one or more of these states, the controller 200 determines, at step 520, if the robot 100 is in a docked state.

If the robot 100 is not in a docked state, the controller 200 determines, at step 522, if exactly one wheel is off the ground. For example, the controller 200 can determine if exactly one wheel is off the ground based on the sensor information from the drive system 204. In this example, the controller 200 determines that one wheel (e.g., either wheel 122a or wheel 122b) of the robot 100 is off the ground when the drive wheel sensors generate information indicative of only one wheel being fully (e.g., up to the movement limit of the respective wheel 122a, 122b) extended relative to a bottom surface of the robot 100 while the remaining wheel (e.g., the other of wheel 122a or 122b) is not fully extended (e.g., retracted relative to the bottom surface of the robot 100). As noted above, in some examples, the movement of the third wheel 128 is included in this determination.

If the robot 100 has exactly one wheel off the ground, the controller 200 selects, at step 524, the behavior as a power-off behavior. In this scenario, the power-off behavior can be associated with control signals that cause the robot 100 to completely power down. In some cases, this power-off behavior is also referred to as a "ship" behavior since it is important to completely power-down the robot 100 for shipping. In this way, selecting the behavior is based on a position of at least one wheel 122a, 122b of the drive system 204 of the robot 100.

The third scenario described with reference to FIG. 5 is performed as soon as the button 102 is maintained in an actuated state for a hold duration (e.g., a "hold" of at least 7 seconds). In this scenario, at step 502, when the user 150 actuates and holds the button 102 for least 7 seconds, the controller 200 proceeds to process 526. While the controller 200 immediately proceeds to process 526 as soon as the button 102 is maintained in the actuated state for 7 seconds, the controller 200 continues to reevaluate the conditions associated with process 526 during a 7-9 second window. For example, the conditions at steps 528, 530, and 532 (described below) are continuously reevaluated during the 7-9 second window of time if the button 102 is maintained in an actuated state during this same time. Once the button 102 is maintained in the actuated state for more than 9 seconds, the controller 200 proceeds to process 534 (described below) instead of process 526.

Referring back to process 526, the controller 200 determines, at step 528, if the robot 100 currently has a bin or tank removed. For example, the controller 200 can determine whether the robot 100 currently has a bin 132 (or tank) removed based on the bin sensors associated with the bin 132 of the robot 100. If the robot 100 determines that the bin 132 is removed (e.g., the bin 132 is not attached to the robot 100), the controller 200 determines, at step 530, if the button 102 is actuated a second time. In order for a second actuation to occur, the user 150 would have to release the actuation of the button 102 after maintaining the button 102 in the actuated state for at least 7 seconds and then actuate the button 102 a second time within the 7-9 second window. If the controller 200 determines, at step 530, that a second actuation of the button 102 has occurred, the controller 200 selects, at step 532, the behavior as a factory reset behavior. In this scenario, the factory reset behavior can be associated with control signals that cause the robot 100 to perform a factory reset to original factory conditions (e.g., memory is cleared, user-defined settings are erased, etc.)

In the example above, the controller 200 selects the behavior based on a number of times the button 102 is actuated. This feature (e.g., generally using a sequence of button actuations) is further described with reference to FIG. 6 below. Furthermore, the controller 200 selects the behavior based on a bin attachment signal associated with the bin 132 of the robot 100. Additionally, as described in this example, the selected behavior can be a factory reset behavior if the bin 132 is removed from the robot 100 and the button 102 is actuated for a first duration (e.g., 7 seconds) followed by a second actuation of the button 102 within a time interval (e.g., within the 7-9 second time window).

The fourth scenario described with reference to FIG. 5 is performed as soon as the button 102 is maintained in the actuated state for a long hold duration (e.g., a "long hold" of at least 9 seconds). In this scenario, at step 502, when the user 150 actuates and holds the button 102 for at least 9 seconds, the controller 200 proceeds to process 534. While the controller 200 immediately proceeds to process 534 as soon as the button 102 is maintained in the actuated state for 9 seconds, the controller 200 continues to reevaluate the conditions associated with process 534 as long as the actuation of the button 102 is maintained. For example, the condition at step 536 (described below) is continuously reevaluated after 9 seconds as long as the button 102 is maintained in an actuated state during this same time. For example, process 534 will reevaluate the condition at step 536 when the button 102 has been maintained in the actuated state for 10 seconds, 15 seconds, 20 seconds, etc.

Referring back to process 534, the controller 200 determines, at step 536, if the robot 100 is currently in one or more states. These states include an awake state, an asleep state, and an error state. For example, the robot 100 can be in an error state when the controller 200 determines that the robot 100 is not working as required (e.g., not moving but should be moving, etc.).

If the robot 100 is in one or more of these states, the controller 200 selects, at step 538, the behavior as a reboot behavior. In this scenario, the reboot behavior can be associated with control signals that cause the robot 100 to perform a device reset (but not to original factory conditions). This allows the robot 100 to retain information in memory (e.g., maps) and user-configured settings.

While FIG. 5 represents four categories of actuation durations (e.g., on actuation, 3-7 seconds, 7-9 seconds, and greater than 9 seconds), in some implementations, more (or less) than four categories are used. In some implementations, the durations and time intervals associated with each process 504, 516, 526, 534 can be different as well.

Referring back to FIG. 3, the method 300 can also include generating, at step 304, by the processor of the controller 200, a control signal based on the behavior. The control signals can be used to cause the robot 100 to initiate the behavior. For example, the control signals can be transmitted to the drive system 204 so that the drive system 204 can control the drive wheels 122a, 122b of the robot 100 to maneuver as part of a particular behavior (e.g., drive to docking station, clean the floor, etc.)

The method 300 can also include causing, at step 306, the autonomous cleaning robot to initiate the behavior using the control signal. As described in the previous example, the controller 200 can cause the drive wheels 122a, 122b of robot 100 to rotate to maneuver the robot 100 to the docking station if the behavior is a docking behavior.

In some implementations, initiating the behavior includes setting a current state of the robot 100. For example, the controller 200 can cause the robot 100 to enter an awake state when the selected behavior is an awake behavior. As another example, the controller 200 can cause the robot 100 to enter a docking state when the selected behavior is a docking behavior. And so on.

Referring to FIG. 6, a flowchart 600 presents additional example scenarios. In particular, FIG. 6 illustrates how a sequence of actuations can be used by the controller 200 to select the behavior.

The first scenario described with reference to FIG. 6 is performed when the button 102 is actuated 3 times. In this scenario, at step 602, as soon as a user actuates (e.g., presses) the button 102 at least 3 times within a time interval (e.g., within 2 seconds), the controller 200 proceeds to process 604 and determines, at step 606, if the bin 132 is currently removed from the robot 100. If the bin 132 is currently removed from the robot 100, the controller 200 determines, at step 608, if robot 100 is currently docked at a docking station (e.g., docking station 1000). If the robot 100 is not docked, the controller 200 determines, at step 610, if exactly one wheel is off the ground. Details regarding the determination of whether the wheels are off the ground are described herein.

If the controller 200 determines that exactly one wheel is off the ground, the controller 200 selects, at step 612, the behavior as a child-lock behavior. In this scenario, the child-lock behavior can be associated with control signals that cause the robot 100 to enter a child-lock state. In some examples, the child-lock behavior causes the robot 100 to ignore actuations of the button 102. In this mode, for example, a user would need to use a software application on a mobile computing device (e.g., a smartphone, a personal computer, a tablet computer, etc.) to cause the robot 100 to leave the child-lock state. In some examples, this mode is also referred to as a pet-lock mode.

The second scenario described with reference to FIG. 6 is performed when the button 102 is actuated 5 times. In this scenario, at step 602, as soon as a user actuates (e.g., presses) the button 102 at least 5 times within a time interval (e.g., within 2 seconds), the controller 200 proceeds to process 614 and determines, at step 616, if the bin 132 is currently removed from the robot 100. If the bin 132 is currently removed from the robot 100 (e.g., not attached to the robot 100), the controller 200 determines, at step 618, if the robot 100 is in an energy savings mode. If the robot 100 is not in an energy savings mode, the controller 200 selects, at step 620, the behavior as an Enter energy savings behavior. In this scenario, the Enter energy savings behavior can be associated with control signals that cause the robot 100 to enter an energy savings mode. In some examples, an energy savings mode configures the robot 100 by turning off all functionality (e.g., network functionality) except a charging functionality and functionality associated with the button 102. An energy savings mode compliant mode can be useful when the robot 100 is not being used for an extended period of time (e.g., weeks, months, etc.) since the robot 100 consumes less power in an energy savings mode compared to a non-energy savings mode.

If the robot 100 is currently in an energy savings mode, the controller 200 determines, at step 622, if the robot 100 is currently docked in a docking station. If the robot 100 is not currently docked, the controller 200 selects, at step 624, the behavior as an Exit energy savings behavior. In this scenario, the Exit energy savings behavior can be associated with control signals that cause the robot 100 to exit an energy savings mode.

In the examples described with reference to FIG. 6, the controller 200 can select the behavior based on a sequence of the actuation of the button 102. In some implementations, the sequence includes a number of times (e.g., 3 times, 5 times, 7 times, etc.) the button 102 is actuated within a time interval (e.g., within 2 seconds, within 3 seconds, within 5 seconds, etc.).

In some implementations, the sequence of actuations of the button 102 can include a sequence of different types of actuation (tap, short hold, hold, etc.). A sequence of actuations can include multiple sequentially-occurring actuations. In some implementations, at least some of the actuations have types that are different from one another. A particular sequence of actuations can be associated with a particular behavior for the robot 100 to initiate. The number of actuations in the sequence of actuations can vary in implementations. For example, the number of actuations can be 2, 3, 4, or more actuations. The types of the actuations in the sequence of actuations can also vary in implementations. The various types of actuations that could be used in the sequence of actuations are described herein. For example, a user 150 can actuate the button 102 with a short tap (e.g., actuated and release within 2 seconds) followed by a short hold (e.g., actuate and release within 2-5 seconds) followed by another short tap (e.g., actuated and release within 2 seconds). In turn, the controller 200 can determine the behavior of the robot 100 based on a sequence of different types of actuation.

FIG. 7A is a schematic of the light indicator 210 of the robot 100 described with reference to FIGS. 1A and 1B. In particular, the top of the light indicator 210, as represented in FIGS. 7A-9C, represents a forward side of the light indicator 210 and corresponds to a forward direction of the robot (e.g., toward front side 106 as represented in FIGS. 1A-1D). Similarly, the bottom of the light indicator 210, as represented in FIGS. 7A-9C, represents a back side of the light indicator 210 and corresponds to a backwards direction of the robot (e.g., toward back side 108 as represented in FIGS. 1A-1D).

As represented in FIG. 7A, the light indicator 210 is transitioning from an awake state to initiating a mission. In particular, FIG. 7A illustrates different illuminations of the light indicator 210 of the robot 100 under different conditions. As previously described with reference to FIG. 1, the button 102 is positioned on a top surface 104 of the robot 100 and the light indicator 210 is configured as a light ring around the circumference of the button 102.

When the user 150 interacts with the button 102 by causing the button 102 to change from an actuated state to an unactuated state, and vice versa, the controller 200 of the robot 100 can cause the light indicator 210 to illuminate in different manners to illustrate different behaviors of the robot 100. For example, the controller 200 of the robot 100 can illuminate a portion of a continuous annular surface positioned around the button 102. In some examples, the light indicator 210 illuminates in different manners to indicate what type of actuation (tap, short hold, hold, etc.) is being performed, and to indicate a progress of a certain actuation. In this way, the length of illumination is based on and/or proportional to the duration of actuation of the button 102.

As represented by button state 702, the light indicator 210 on the robot 100 does not emit light when the robot 100 is asleep. As used herein, a thin boundary line 752 of the light indicator 210 is used to represent an off-state. In some examples, an absence of light emission can correspond to a user interface that is not active on the surface of the robot 100. For example, the user 150 can tap the button 102 during the robot's asleep state to awaken the robot 100. In response, the controller 200 can transition the light indicator 210 around the button 102 from an off state (button state 702) to an illuminated state (button state 704), and the controller 200 can cause the light indicator 210 to illuminate with a particular color and a particular illumination pattern. As used herein, a thick boundary line 754 of the light indicator 210 is used to represent an on-state. In this example, the controller 200 causes the light indicator 210 to illuminate with a white light. However, in other examples, the color can be blue, red, green, or another color. In this way, any color light can be used by the light indicator 210.

In this example, the controller 200 causes the light indicator 210 to illuminate with an illumination pattern representing a constant illumination throughout the entire circumference of the light indicator 210. For example, while the actual implementation of the light indicator 210 can be a discrete number of LEDs (e.g., 8 LEDs), as described with reference to FIGS. 1A and 1B above, these LEDs combine to illuminate the entire light indicator 210. In some examples, illuminating the entire light indicator 210 is referred to as a "solid illumination." In this way, the light indicator 210 is perceived by the user 150 to be completely illuminated with light. However, in other examples, the illumination pattern can be spatially discontinuous (e.g., off vs. on states, bright vs. dim states, etc.), include pulsed illuminations (e.g., illuminations that vary over time, etc.). These illumination patterns are described in further detail below.

For example, a solid illumination of a white light (as represented by button state 704) can indicate that the robot 100 is awake. Additionally, when the user 150 actuates the button 102 again to transition the robot 100 from the awake state to a start (or resume) mission state (e.g., by actuating the button 102 with a second tap), the robot 100 transitions from an awake state to the start mission state. In turn, the controller 200 causes the light indicator 210 to transition from a solid illumination of white light (button state 704) to an illumination pattern indicative of the mission being performed (button state 706). As used herein, a thick dashed boundary line 756 of the light indicator 210 is used to represent a mission specific illumination pattern.

In some examples, an illumination pattern of a periodic sweep sequence of white light symmetrically across the button 102 is associated with a cleaning mission. In some examples, an illumination pattern of a counterclockwise swirl sequence of blue light around the circumference of the button 102 is associated with a spot cleaning mission. In some examples, an illumination pattern of a marching forward sequence of blue light symmetrically across the button 102 is associated with a docking mission (e.g., returning to a docking station). In this example, the marching forward sequence can mean that light travels from a back side of the light indicator 210 to a front side of the light indicator 210. In this way, light travels from the back side 108 of the robot 100 to the front side 106 of the robot 100.

As described above, the controller 200 can select behaviors associated with these states based on the actuation of the button 102. In this way, the controller 200 causes the light indicator 210 to illuminate with a particular intensity, color, pattern, and pulse based on the actuation of the button 102.

FIG. 7B is a schematic of the light indicator 210 of the robot 100 transitioning from a mission state (e.g., where the robot 100 is performing a cleaning behavior) to a pause state and then to a docking state (e.g., where the robot 100 is returning to a docking station (e.g., docking station 1000)). In particular, FIG. 7B represents different illuminations of the light indicator 210 of the robot 100 based on these different states. As described above with reference to FIG. 7A, the controller 200 can select behaviors associated with these states based on the actuation of the button 102. In this way, the controller 200 causes the light indicator 210 to illuminate with a particular intensity, color, pattern, and pulse based on the actuation of the button 102.

As represented in FIG. 7B, and in particular by button states 712, 716, the light indicator 210 can be illuminated in a percentage varying from 0 to 100% around the circumference of the light indicator 210. In some implementations, the illumination percentage of the light indicator 210 indicates a level of completion of a mission of the robot 100. For example, the level of completion can represent whether the robot 100 is starting a mission, is mid-mission, is ending a mission, is returning to a docking station, and is docked at the docking station. In this way, the controller 200 causes the light indication 210 to illuminate with a different percentage based on a level of completion of the mission. In the example represented in FIG. 7B, button state 712 represents a cleaning mission.

In some examples, the percentage varies over time to give an indication of motion. For example, the controller 200 causes the light indicator 210 to progressively "fill" with light during a duration of the cleaning mission. In this scenario, the controller 200 controls the light indicator 210 to begin filling with light at a first location and symmetrically fills the light indicator 210 from the first location to a second location located diametrically opposite of the first location in proportion to the duration of the mission. In some examples, the first location is associated with a back side of the light indicator 210 (e.g., the side closest to the back side 108 of the robot 100 as shown in FIGS. 1A and 1B) and the second location is associated with a front side of the light indicator 210 (e.g., the side closest to the front side 106 of the robot 100 as shown in FIGS. 1A and 1B). In this way, the light indicator 210 progressively and symmetrically fills from a back side of the light indicator 210 to a front side of the light indicator 210. The controller 200 causes the light indication 210 to illuminate with a percentage in proportion to a duration of the mission and/or the actuation of the button 102.

While the light indicator 210 is describes as progressively and symmetrically filling from a back side to a front side, other implementations are possible. For example, the controller 200 can control the light indicator 210 to fill asymmetrically (e.g., to perform a 360° sweep around the circumference). In another example, the controller 200 can control the light indicator 210 to progressively and symmetrically fill from a front side to a back side, from a left side to a right side, or from a right side to a left side. Further still, the controller 200 can control the light indicator 210 to begin fill and end fill at different locations based on the behavior of the robot 100.

If a user 150 actuates the button 102 of the robot 100 when the robot 100 is mid-mission (e.g., by actuating the button 102 with a 0-2 second tap), the controller 200 temporarily pauses the robot 100. For example, the controller 200 of the robot 100 can cause the drive system 204 to halt the movement of the robot 100. The controller 200 also causes the light indicator 210 to illuminate with a pulsed solid illumination of white light, as represented by button state 714. The pulsed light can indicate to the user 150 that the robot 100 has paused while mid-mission. In some examples, the pulsed light is pulsed with a frequency of 1 pulse per second (e.g., 1 Hz), but other frequencies can also be used (e.g., 0.1 Hz, 2 Hz, etc.). In some examples, a pulsed illumination is where the intensity of the light varies based on time. In some examples, the pulsed illumination sinusoidally transitions from an off-state to an on-state as a function of time. The controller 200 can control both solid illuminations and discontinuous illuminations to pulse.

Then, if the user 150 holds the button 102 in the actuated state for a short hold duration (e.g., between 3-5 seconds), to indicate that the robot 100 should return to a docking station. For example, a similar scenario is described above with reference to step 432 of FIG. 4. In turn, the controller 200 can control the robot 100 to drive home to a docking station and cause the light indicator 210 to illuminate according to button state 716 to indicate that the robot 100 is returning home. As used herein, a gray line 758 representing the boundary of the light indicator 210 is used to represent a color different from white. In this example, a thick gray line refers to a blue color while a thick black line refers to a white color, but other colors can be used in other examples.

In this example, the controller 200 causes the light indicator 210 to illuminate with a back to front fill of blue light. In some examples, this is perceived by the user 150 as representing a marching sequence of light in a direction in front of the robot. In this way, the illumination pattern can represent a sequence of light indicating a direction of travel of the robot 100. When the robot 100 arrives at the docking station and successfully docks (e.g., successfully makes an electrical connection with the contacts 1002a, 1002b of the docking station 1000 shown in FIG. 10), the controller 200 can cause the light indicator 210 to change the illumination again. For example, the controller 200 can cause the light indicator 210 to change from the marching blue sequence represented in button state 716 to a pulsing sequence of white light to indicate to the user 150 that the robot 100 is charging.

In the examples of FIGS. 7A and 7B, a user 150 can interact with the button 102 to cause the robot to awaken (button state 704), start (or resume) a mission (button state 706), pause a mission (button state 714), and return to a docking station (button state 716). In particular, once the robot 100 is awake and paused (e.g., at button state 704 or 714), a tap can be used to start a mission (button state 706) and a short hold can be used to cause the robot 100 to return home to a docking station (button state 716).

FIGS. 8A and 8B are schematics of the light indicator 210 of the robot 100 during a transition from an active state to returning to a docking station. For example, the controller 200 of the robot 100 can cause the light indicator 210 to illuminate to indicate that the robot 100 is active (e.g., running), as represented by button state 802. For example, a robot 100 in an active state is different from a robot 100 moving in a mission state. For example, a robot 100 in the running or active state can be associated with a robot 100 that is driving to (or from) a docking station and to (or from) a mission. During the robot's running state, the controller 200 can cause the light indicator 210 to illuminate according to various illumination patterns such as the illumination patterns previously described.

During the robot's running state, a user 150 can actuate the button 102 of the robot 100 (e.g., by a 0-2 second tap), and the controller 200 can cause the light indicator 210 to transition from emitting illumination pattern corresponding to the particular mission being performed (button state 802) to emitting a solid (or continuous) white light, as represented by button state 804. However, while button state 804 is associated with white light, other colored light can be used in other examples (e.g., blue, red, green, or another color). Additionally, when the user 150 actuates the button 102 of the robot 100 while the robot 100 is in the running state, the controller 200 pauses the movement of the robot 100. At this stage, the user 150 can provide additional interaction to the button 102 to indicate the next action of the robot 100.

For example, the controller can control the light indicator 210 based on the duration of the actuation (as previously described). For example, while the light indicator 210 is illuminating the solid white light according to button state 804, the user 150 can still interact with the button 102 to cause additional behavior of the robot 100. In this example, the user 150 actuates the button 102 a second time (e.g., after pressing the button 102 the first time to pause the robot 100) and continues to hold down the button 102 for at least 2 seconds.

Once the user 150 has maintained the actuation of the button 102 for 2 seconds, the controller 200 selects the behavior. In this example, the controller 200 selects the behavior to be docking behavior (e.g., to return home to the docking station). At this point, the controller 200 continues to control the light indication 210 to provide further indication to the user 150 before causing the robot 100 to initiate the selected behavior.

In this example, once 2 seconds has been reached, the controller 200 controls the light indicator 210 to illuminate according to the illumination pattern represented by button states 806. In particular, once the actuation has been maintained for 2 seconds, the controller 200 causes the light indicator 210 to begin to fill in with a second color. In this example, the light indicator 210 was initially filled with white light (e.g., representing a paused state of the robot) and is now beginning to fill with blue light because the robot 100 is providing an indication that the user 150 is about to instruct the robot 100 to return home to the docking station. In this way, the second color can represent the color of light associated with an illumination pattern of the behavior that would be selected if the user 150 continues to maintain the actuation of the button 102.

In this example, the controller 200 controls the light indicator 210 to fill 25% with blue light and 75% with white light once the actuation has been maintained for 2.25 seconds, as represented by button state 806a. Furthermore, the controller 200 controls the light indicator 210 to fill 50% with blue light and 50% with white light once the actuation has been maintained for 2.5 seconds, as represented by button state 806b. Similarly, the controller 200 controls the light indicator 210 to fill 75% with blue light and 25% with white light once the actuation has been maintained for 2.75 seconds, as represented by button state 806c. Then the controller 200 controls the light indicator 210 to fill 100% with blue light once the actuation has been maintained for 3 seconds, as represented by button state 806d.

In this way, the controller 200 of the robot 100 can illuminate a portion of the light indicator 210 in proportion to the duration the button 102 is actuated. In particular, the controller 200 can progress the filling of the light indicator 210 from 0% to 10% to 25%, for example, until 100% is reached.

In this scenario, the controller 200 controls the light indicator 210 to begin filling with the blue light at a first location and symmetrically fills the light indicator 210 from the first location to a second location located diametrically opposite of the first location in proportion to the duration of the mission. In some examples, the first location is associated with a back side of the light indicator 210 (e.g., the side closest to the back side 108 of the robot 100 as shown in FIGS. 1A and 1B) and the second location is associated with a front side of the light indicator 210 (e.g., the side closest to the front side 106 of the robot 100 as shown in FIGS. 1A and 1B). However, the controller 200 can control the light indicator 210 to progressively and symmetrically fill from a front side to a back side, from a left side to a right side, or from a right side to a left side. Furthermore, the controller 200 can control the light indicator 210 to begin fill and end fill at different locations based on the behavior of the robot 100 and/or the actuation of the button 102. In this way, the controller 200 can control a length of the illuminated portion of the light indicator 210 based on the duration of the actuation of the button 102.

In some implementations, the controller 200 can cause the audio output system 208 (as represented in the schematic of FIG. 2) to provide music associated with the illumination sequence of the light indicator 210 and/or associated with the behavior of the robot 100. For example, during the progression of the light indicator 210 through the sequence of button states 806, the audio output system 208 may provide noises, audible sounds, voices, or songs, to indicate the progression of the light indicator 210. For example, a speaker of the audio output system 208 can produce an audible tone to indicate to the user when button state 806d is reached.

As described above, in this example the controller 200 selected the behavior to be docking behavior at the 2 minute mark and continues to provide an indication to the user 150 (e.g., both visual and audible). Furthermore, the controller 200 controls the light indication 210 according to a raceback behavior, as represented by button states 806e-806h. The raceback behavior provides an indication to the user 150 that it is okay to remove their finger from the button 102 to release the actuation.

In this example, the light indicator 210 begins completely filled with blue light (button state 806d) and the controller 200 controls the light indicator 210 to progressively decrease the amount of blue light emitted by the light indicator over time. In particular, the controller 200 controls the light indicator 210 to fill 75% with blue light and 25% off (e.g., no light) 0.5 seconds after the 3 second mark, as represented by button state 806e. Furthermore, the controller 200 controls the light indicator 210 to fill 50% with blue light and 50% off 1 second after the 3 second mark, as represented by button state 806f. Similarly, the controller 200 controls the light indicator 210 to fill 25% with blue light and 75% off 1.5 seconds after the 3 second mark, as represented by button state 806g. Then the controller 200 controls the light indicator 210 to completely turn off 2 seconds after the 3 second mark (i.e., 5 seconds), as represented by button state 806h. Once the 5 second mark has been reached, the controller 200 causes the robot 100 to initiate the selected behavior. In this example, the robot 100 is instructed to return to the docking station and will proceed to drive to the docking station after the light indicator 210 is completely off at the 4 second mark.

In this way, the button states 806 provide an indicator of a time buffer to the user 150. For example, users 150 generally will not know when 2 seconds has been reached so the button states 206a-206d are intended to let the user 150 know that is it ok to release the actuation of the button 102. If the user 150 continues to maintain the actuation of the button 102, the light indicator 210 continues to provide an indication to the user 150 until 5 seconds has been reached. In this way, the buffer is a window between 2-5 seconds.

Additionally, the audio output system 208 may provide or output different noises during the raceback period so the user 150 can differentiate between the raceback period and a time during which the light indicator 210 is progressing to full illumination.

While specific fill percentages and times were described with reference to button states 806, other times and percentages can be used. Additionally, button states 806 can include more or less than 8 states (e.g., 6 states, 10 states, etc.).

In some implementations, the controller 200 causes the robot 100 to initiate the selected behavior as soon as the user 150 releases the actuation of the button 102 (i.e., instead of waiting for the raceback sequence to complete). For example, if the user 150 releases actuation of the button 102 while the light indicator 210 is illuminated according to button state 806f, the controller 200 can immediately cause the robot 100 to begin the selected behavior. In this case, the selected behavior is a docking behavior so the controller 200 would cause the robot 100 to begin driving to the docking station.

Additionally, the controller 200 can instruct the audio output system 208 to broadcast audio from one or more speakers during this time to illustrate that the robot 100 is transitioning to another state or that the robot 100 has just completed a mission, to name a few examples. The audio can correspond to music, noises, voices, or another sound to indicate the transition or a completed state.

FIGS. 9A-9C are schematics of a light indicator 210 of the robot 100 during a rebooting transition. FIGS. 9A and 9B include similar depictions and functions corresponding to FIGS. 8A and 8B, and are not explicitly repeated. In particular, button states 902, 904, and 906 are the same as button states 802, 804, and 806 described with reference to FIGS. 8A and 8B. However, in this example, the button 102 is maintained in the actuated state after the 5 second mark associated with button state 806h.

If a user 150 maintains the actuation of the button 102 for more than 5 seconds, then the controller 200 selects different behavior. In this example, the controller 200 selects the behavior as a reboot behavior. For example, the robot 100 can be rebooted for software upgrades, maintenance, or some other function. In this example, the controller 200 causes the light indicator 210 to illustrate different colors, brightness, patterns, and style of the lights to provide an indication that the robot 100 is progressing to perform a reboot. For example, as represented in FIG. 9C, the user 150 can continue maintaining the actuation of the button 102 after the raceback period of 5 seconds and continuing into the 5-7 second period. During this time, the controller 200 controls the light indicator 210 to remain off (e.g., no light is emitted). In this way, the controller 200 can turn off the user interface of the robot 100 based on the duration of the actuation.

If the user 150 continues to maintain actuation of the button 102 for 7 seconds, then the controller 200 changes the selected behavior from docking behavior to reboot behavior, as noted above. The controller 200 also causes the light indicator 210 to begin another raceback sequence as represented by button states 908b, 908c, 908d, 908e, and 908f. The user 150 can release actuation of the button 102 at any point during the raceback sequence and the robot 100 will still initiate the reboot sequence.

In this example, the controller 200 controls the light indicator 210 to fill with white light, as represented by button state 908b. Then the controller 200 controls the light indicator 210 to progressively decrease the light fill percentage from 100% to 80% to 60% and so on, until 0% is reached, as represented by button states 908b-908f. In this example, the controller 200 controls the light indicator 210 to progressively decrease the light fill percentage from 100% to 0% over a duration of 2 seconds.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

A number of implementations have been described. Nevertheless, it will be understood that various modifications may be made.

For example, the implementations described herein involve behaviors such as a cleaning behavior, a docking behavior, a sleep behavior, an awake behavior, a resume behavior, a pause behavior, a cancel behavior, an evacuation behavior, a reboot behavior, a power-off (ship mode) behavior, a factory reset behavior, etc.

In other implementations, the behaviors initiated by user actuation of the button can include different types of cleaning behaviors. For example, the cleaning behavior can represent a full-home cleaning behavior (e.g., to clean each and every room of the home), a single-room cleaning behavior (e.g., to clean a single room of the home), an edge-clean-only cleaning behavior (e.g., such that the robot only cleans edges of an environment), a predefined duration cleaning behavior (e.g., less than 60 minutes, less than 30 minutes, etc.), a low-power cleaning behavior (e.g., to clean using low vacuum power to reduce power consumption), a high-powering behavior cleaning behavior (e.g., to clean using high vacuum power for improved vacuum performance), and/or a spot cleaning behavior (e.g., where the robot cleans a bounded area).

In other implementations, the behavior includes a map training behavior. For example, the robot drives around the home to map the environment as part of a map training process. The cleaning systems are turned off during a map training behavior.

In other implementations, the behaviors can be user assigned. For example, a user can use an application that runs on a mobile device to assign a particular behavior to a particular type of user actuation. In this example, the user can assign a cleaning behavior with a short hold (e.g., 2-5 second) actuation of the button instead of a tap (e.g., less than 2 second actuation). Similarly, the user can redefine the conditions described above with reference to the flows charts in FIGS. 4-6 such that the controller of the robot selects different behavior than what is represented in those flow charts. In this way, the controller can select the behavior based on user assigned conditions which associate the behaviors to the various actuation durations (e.g., tap, short hold, hold, long hold, etc.), actuation sequences (e.g., a number of times the button is actuated within a time interval), sensors (e.g., bin sensors, docking sensors, wheel sensors, bumper sensors, etc.), and current states of the robot (e.g., awake state, sleep state, cleaning state, etc.)

While robot 100 is described as having a single button (e.g., button 102), some robots can have multiple buttons. For example, some of the buttons can be dedicated function buttons (e.g., a dedicated button to return to a docking station) while one of the buttons is a multi-function button described herein (e.g., button 102).

In some implementations, the button 102 is a mechanical switch, a capacitance switch, and/or a touchscreen display. For example, if the button 102 is implemented as part of a touchscreen display, the light indicator 210 can be part of the touchscreen display as well. In this example, the entire surface of the button 102 can be used for illumination and also serve as a surface for the button.

Accordingly, other implementations are within the scope of the claims.

What is claimed is:

1. An autonomous cleaning robot comprising:
   a drive configured to maneuver the autonomous cleaning robot about a floor surface;
   a cleaning system to clean the floor surface as the autonomous cleaning robot is maneuvered about the floor surface;
   a robot button positioned on the autonomous cleaning robot; and
   a controller in electrical communication with the drive and the robot button, the controller configured to perform operations comprising:
   selecting a behavior of the autonomous cleaning robot from a plurality of behaviors of the autonomous cleaning robot responsive to (i) a duration of actuation of the robot button and (ii) one or more states of the autonomous cleaning robot; and
   causing the autonomous cleaning robot to initiate the behavior.

2. The autonomous cleaning robot of claim 1, wherein selecting the behavior from the plurality of behaviors of the autonomous cleaning robot comprises selecting among at least three different behaviors of the autonomous cleaning robot.

3. The autonomous cleaning robot of claim 1, wherein selecting the behavior from the plurality of behaviors of the autonomous cleaning robot is further based on sensor information generated from one or more sensors of the autonomous cleaning robot, the sensor information being independent from the actuation of the robot button.

4. The autonomous cleaning robot of claim 3, wherein the sensor information represents one or more of: an actuation of a bumper of the autonomous cleaning robot, a position of a wheel of the drive of the autonomous cleaning robot, a presence of a bin attached to the autonomous cleaning robot, or whether the autonomous cleaning robot is docked with a docking station.

5. The autonomous cleaning robot of claim 1, wherein the one or more current states comprise one or more of the following states: a sleep state, an awake state, an idle state, a cleaning state, a docking state, a child-lock behavior state, or a reboot state.

6. The autonomous cleaning robot of claim 1, wherein selecting the behavior from the plurality of behaviors of the autonomous cleaning robot is further based on a sequence of the actuation of the robot button, the sequence comprising a number of times the robot button is actuated within a time interval.

7. The autonomous cleaning robot of claim 1, wherein the plurality of behaviors comprise a first behavior of the autonomous cleaning robot and a second behavior of the autonomous cleaning robot, wherein selecting the behavior comprises selecting the behavior based on the duration such that the selected behavior corresponds to the first behavior if the robot button is actuated for a first duration and the selected behavior corresponds to the second behavior if the robot button is actuated for a second duration longer than the first duration.

8. The autonomous cleaning robot of claim 1, wherein the robot button comprises a light ring configured to illuminate a portion of a top surface of the autonomous cleaning robot, wherein the controller is configured to control a length of the illuminated portion based on the duration of the actuation of the robot button.

9. The autonomous cleaning robot of claim 1, wherein the one or more states are responsive to the duration of actuation of the robot button.

10. The autonomous cleaning robot of claim 1, wherein the plurality of behaviors of the autonomous cleaning robot are responsive to the duration of actuation of the robot button.

11. The autonomous cleaning robot of claim 1, wherein selecting the behavior comprises:
determining a first state of the one or more states of the autonomous cleaning robot responsive to the duration of actuation of the robot button;
determining a second state of the one or more states of the autonomous cleaning robot responsive to the determined first state; and
selecting the behavior responsive to the determined second state.

12. The autonomous cleaning robot of claim 1, wherein selecting the behavior comprises:
selecting a first behavior of the autonomous cleaning robot responsive to a first duration of actuation of the robot button and one or more first states of the autonomous cleaning robot; and
selecting a second behavior of the autonomous cleaning robot responsive to a second duration of actuation of the robot button and one or more second states of the autonomous cleaning robot,
wherein the selected behavior comprises the first behavior and the second behavior, and the first behavior is different from the second behavior.

13. The autonomous cleaning robot of claim 12, wherein at least one state of the one or more first states and the one or more second states is present in only one of the one or more first states or the one or more second states.

14. A method of operating an autonomous cleaning robot, the method comprising:
selecting, by a processor, a behavior of the autonomous cleaning robot from a plurality of behaviors of the autonomous cleaning robot based on (i) at least a duration of actuation of a robot button of the autonomous cleaning robot and (ii) one or more states of the autonomous cleaning robot;
generating, by the processor, a control signal based on the behavior; and
causing the autonomous cleaning robot to initiate the behavior using the control signal.

15. The method of claim 14, wherein selecting the behavior from the plurality of behaviors of the autonomous cleaning robot comprises selecting among at least three different behaviors.

16. The method of claim 14, wherein selecting the behavior from the plurality of behaviors of the autonomous cleaning robot is further based on sensor information generated from one or more sensors of the autonomous cleaning robot, the sensor information representing one or more of: an actuation of a bumper of the autonomous cleaning robot, a position of a wheel of a drive of the autonomous cleaning robot, a presence of a bin attached to the autonomous cleaning robot, or whether the autonomous cleaning robot is docked with a docking station.

17. The method of claim 14, wherein the one or more current states comprise one or more of the following states: a sleep state, an awake state, an idle state, a cleaning state, a docking state, a child-lock behavior state, or a reboot state.

18. The method of claim 14, wherein selecting the behavior from the plurality of behaviors of the autonomous cleaning robot is further based on a sequence of the actuation of the robot button, the sequence comprising a number of times the robot button is actuated within a time interval.

19. The method of claim 14, wherein the plurality of behaviors comprise a first behavior of the autonomous cleaning robot and a second behavior of the autonomous cleaning robot, wherein selecting the behavior comprises selecting the behavior based on the duration such that the selected behavior corresponds to the first behavior if the robot button is actuated for a first duration and the selected behavior corresponds to the second behavior if the robot button is actuated for a second duration longer than the first duration.

20. The method of claim 14, further comprising:
illuminating a portion of a light ring of the autonomous cleaning robot; and
controlling a length of the illuminated portion based on the duration of the actuation of the robot button.

21. A non-transitory computer-readable storage medium comprising at least one program for execution by a processor of an autonomous cleaning robot, the at least one program including instructions which, when executed by the processor, cause the autonomous cleaning robot to perform operations comprising:

selecting, by the processor, a behavior of the autonomous cleaning robot from a plurality of behaviors of the autonomous cleaning robot based on (i) at least a duration of actuation of a robot button of the autonomous cleaning robot and (ii) one or more states of the autonomous cleaning robot;

generating, by the processor, a control signal based on the behavior; and causing the autonomous cleaning robot to initiate the behavior using the control signal.

22. The non-transitory computer-readable storage medium of claim 21, wherein selecting the behavior from the plurality of behaviors of the autonomous cleaning robot comprises selecting among at least three different behaviors and selecting the behavior from the plurality of behaviors of the autonomous cleaning robot is further based on sensor information generated from one or more sensors of the autonomous cleaning robot, the sensor information being independent from the actuation of the robot button.

23. The non-transitory computer-readable storage medium of claim 21, wherein the one or more current states comprise one or more of the following states: a sleep state, an awake state, an idle state, a cleaning state, a docking state, a child-lock behavior state, or a reboot state.

24. The non-transitory computer-readable storage medium of claim 21, wherein selecting the behavior from the plurality of behaviors of the autonomous cleaning robot is further based on a sequence of the actuation of the robot button, the sequence comprising a number of times the robot button is actuated within a time interval.

25. The non-transitory computer-readable storage medium of claim 21, wherein the plurality of behaviors comprise a first behavior of the autonomous cleaning robot and a second behavior of the autonomous cleaning robot, wherein selecting the behavior comprises selecting the behavior based on the duration such that the selected behavior corresponds to the first behavior if the robot button is actuated for a first duration and the selected behavior corresponds to the second behavior if the robot button is actuated for a second duration longer than the first duration.

* * * * *